United States Patent [19]
Fujita et al.

[11] Patent Number: 5,365,153
[45] Date of Patent: Nov. 15, 1994

[54] AC VARIABLE SPEED DRIVING APPARATUS AND ELECTRIC VEHICLE USING THE SAME

[75] Inventors: Kouetsu Fujita; Takao Yanase; Shigenori Kinoshita; Osamu Motoyoshi; Yoshio Ito, all of Kawasaki, Japan

[73] Assignee: Fuji Electric Co., Ltd., Kawasaki, Japan

[21] Appl. No.: 72,756

[22] Filed: Jun. 7, 1993

[30] Foreign Application Priority Data

Jun. 10, 1992 [JP] Japan ............... 4-177562
Jun. 26, 1992 [JP] Japan ............... 4-193210
Jul. 17, 1992 [JP] Japan ............... 4-213464
Jul. 17, 1992 [JP] Japan ............... 4-213465

[51] Int. Cl.$^5$ ............... H02P 1/54
[52] U.S. Cl. ............... 318/34; 318/49; 318/41; 318/803; 318/47
[58] Field of Search ............... 318/34, 49, 41, 803, 318/47

[56] References Cited
U.S. PATENT DOCUMENTS

| | | | |
|---|---|---|---|
| 3,549,965 | 12/1970 | Hausmann | 318/47 |
| 3,586,938 | 6/1971 | LeGall | 318/49 |
| 4,392,099 | 7/1983 | Kuniyoshi | 318/803 |
| 4,556,809 | 12/1985 | Beisse et al. | |
| 5,015,938 | 5/1991 | Oehler et al. | 318/41 |
| 5,130,617 | 7/1992 | Oshima et al. | 318/34 |
| 5,166,582 | 12/1992 | Jaeger et al. | 318/47 |

FOREIGN PATENT DOCUMENTS 84717 8/1983 European Pat. Off. .
93615 11/1983 European Pat. Off. .

OTHER PUBLICATIONS

"An AC Servo Motor and Control of the same by a Micro-Computer", Sogou Denshi Publishing Ltd., Japan, 4th Edition, Jun. 10, 1989, pp. 74–83.
Watanabe, et al, "A Sensorless Detecting Strategy of Rotor Position and Speed on Permanent Magnet Synchronous Motor", The Journal of the Institute of Electric Engineers of Japan, vol 110–D, No. 11, 1990 pp. 1194–1200.

Primary Examiner—William M. Shoop, Jr.
Assistant Examiner—Karen Masih
Attorney, Agent, or Firm—Spencer, Frank & Schneider

[57] ABSTRACT

An AC variable speed driving apparatus including an AC motor and an inverter for driving the motor. The AC motor includes a synchronous motor and an induction motor. The synchronous motor includes first stator windings and a first rotor having a permanent magnet. The induction motor includes second stator windings and a second rotor. The first and second stator windings are disposed so that they do not magnetically interfere with each other. The first and second rotors are mounted on a common axis of rotation. The inverter supplies AC power to the stator windings so that the synchronous motor and the induction motor are driven independently. A highly efficient, large output and low cost system can be realized in a wide speed range.

13 Claims, 19 Drawing Sheets

($I_{a2} > I_{a1}, E_{a1} > E_{a2}$)

AC VARIABLE SPEED DRIVING APPARATUS AND ELECTRIC VEHICLE USING THE SAME

BACKGROUND OF THE INVENTION

1. Field of the Invention

The present invention relates to an AC variable speed driving apparatus and an electric vehicle using the same. The electric vehicle generally employs a battery as a power supply and an inverter for converting the DC voltage of the battery to the AC voltage to be supplied to its driving apparatus.

2. Description of the Related Art

FIG. 1 is an electric system for an electric vehicle known in the art, which comprises a battery as a power supply, and drives wheels by AC motors via inverters. In FIG. 1, the reference numeral 1 designates a battery comprising a sufficient number of unit cells 100 connected in series. The reference numeral 4 denotes an inverter that supplies AC power to an AC motor 5 for driving wheels 81 and 82. The output shaft of the motor 5 is coupled to a differential gear 7 via a reduction gear 6, and drives the wheels 81 and 82. A protective fuse 3 is used as needed and a main switch 2 connects or disconnects the battery 1 to or from the inverter 4.

The performance of an electric vehicle must be comparable to that of an internal combustion engine car.

FIG. 2 illustrates an example of the torque-rotational frequency characteristics of a driving motor. As shown in FIG. 2, the torque is maintained constant over the range of rotation frequencies 0–$N_1$, whereas the output power becomes constant beyond the rotation frequency $N_1$. In this figure, [1] indicates the characteristic curve when an amount of depression of an accelerator pedal is maximum, [3] indicates the characteristic curve when it is minimum, and [2] indicates the characteristic curve when it is intermediate.

The following requirements must be met in order to have electric vehicles used as often as internal combustion engine cars.

(1) Having good acceleration characteristics.
(2) Having high mileage per charge.
(3) Providing high reliability and ease of maintenance.
(4) Comprising a battery of good performance in both output density (W/kg) and energy density (Wh/kg).
(5) Comprising a mechanism that is highly efficient, small in size, light, and easy to maintain.
(6) Low cost.

FIG. 1 shows a typical system of such an electric vehicle, which employs a lead acid battery or nickel-cadmium cells as the battery 1, a brushless AC motor as the motor 5, and a transistor inverter as the inverter 4.

Next, the AC motor for the driving wheels will be described in more detail.

First, let us suppose that an induction motor is used as the AC motor 5.

As is known in the art, an induction motor generates its main magnetic flux from the primary current, and allows the magnetic flux and the torque to be independently controlled by a vector control. Thus, by employing a magnetic flux weakening control, the induction motor can provide a wide range of speeds in the driving system of an electric vehicle, in which the primary voltage is restricted by the voltage of the battery.

However, since the induction motor generates torque by inducing a current to flow through the secondary side, its efficiency reduces owing to the copper loss at the secondary side. This requires a large capacity cooling device. In addition, there is another problem in that the input efficiency of the motor reduces because the exciting current is supplied from the primary side and this increases copper loss and eddy current loss. In particular, the efficiency is greatly reduced in a low output power range, and this presents a great problem in the field of the electric vehicle.

Next, let us suppose that a synchronous motor is used as the AC motor.

Synchronous motors are generally divided into a revolving-armature type and a revolving-field type, both of which employ slip ring brushes or a rotary transformer in order to supply currents to the rotor windings. This, however, not only increases the size of the motor, but also reduces the efficiency thereof. Accordingly, a permanent magnet synchronous motor whose rotor is made of permanent magnets, and which is widely used as an AC servo-motor, is suitable for an electric vehicle.

This motor makes it possible to increase the power factor because it has no secondary copper loss, and hence provides high efficiency.

The permanent magnet synchronous motor has a constant field flux generated by the permanent magnets. In addition, the number of turns of the primary windings of the motor cannot be increased beyond a certain number because the voltage of the power supply is limited in the electric vehicle. Accordingly, it is very difficult for the motor to increase the rotation frequency and to provide required output power without increasing its currents. In other words, it is difficult to achieve high speed and large output power simultaneously under the condition that the currents are restricted to a certain amount.

Furthermore, high performance magnets that are used as permanent magnets are generally expensive, and hence the total cost of the system increases.

In Summary, requirements for AC motors for driving wheels of an electric vehicle are as follows:

(1) Having high efficiency, particularly in a low output range.
(2) Providing large output power in acceleration.
(3) Having a wide speed range.
(4) Small in size, light, and inexpensive.

Next let us consider the battery.

Although there are various types of batteries for an electric vehicle as mentioned above, there is no battery, for the present, that satisfies the output density (W/kg) and the energy density (Wh/kg) at the same time at reasonable cost. Accordingly, the type and capacity of the battery is decided considering the performance of the car, cost, and the like.

As an inverter, a transistor inverter is mainly used. This is because it is enough for the inverter for an electric vehicle to have a capacity not more than one hundred kVA, and an input voltage range of 100–300 V. The maximum output of the inverter takes place during acceleration, and in this case, the output current of the inverter reaches several hundred amperes. Thus, a plurality of power transistors are usually connected in parallel in the inverter.

FIG. 3 shows an example of a conventional AC variable speed driving apparatus using an AC motor and an inverter.

In this figure, a main circuit comprises an AC power supply 101, an inverter 102, an AC motor M, a speed sensor 12, and a position sensor 12'. The inverter includes a rectifier portion that performs AC/DC conversion, and an inverter portion that performs DC/AC conversion.

A control circuit, on the other hand, comprises an adder 103, a PI (Proportional-Integral) controller 104, and a voltage-current computing circuit 105. The adder 103 computes a speed difference $\Delta n$ from an actual speed value n, which is detected by and fed from the sensor 12, and a speed command value n*. The PI controller 104 produces a torque command $\tau^*$ such that the difference $\Delta n$ becomes zero. The voltage-current computing circuit 105 computes from the torque command the voltage or current applied to the stator windings of the AC motor, and supplies it to the inverter 102 as a command value. In FIG. 3, the voltage-current computing circuit 105 provides the inverter 102 with a current command value i*.

The operation of the voltage-current computing circuit 105 varies in accordance with the type of the AC motor and the motor control scheme. When a permanent magnet synchronous motor is employed as the AC motor and the vector control like that used for an AC servo motor is adapted, the phase of the current whose amplitude is proportional to the torque command is made perpendicular to the position of the permanent magnet detected by the position sensor 12'.

On the other hand, when an induction motor is used as the AC motor, a vector control system as shown in FIG. 4 is widely employed. Details of the vector control system is described in 4th edition of "An AC servo motor and control of the same by a microcomputer" Sogou Denshi Publishing Ltd., Japan, Jun. 10, 1989, from which FIG. 4 is cited.

In the conventional system, the sensors 12 and 12' are required to detect the rotation speed of the AC motor and the magnetic position of a rotor. The sensors may sometimes cause faults in the system, and increases cost.

In view of this, various systems are proposed which drive a synchronous motor or an induction motor without using sensors. These systems, however, require a complicated control circuit and a complicated computing circuit.

In summary, the electric system of an electric vehicle must meet the following requirements.

(1) It can achieve a great output torque in acceleration.

(2) It should have high total efficiency in a low output power range.

(3) It should have high availability of a battery, thereby reducing the size and weight of the battery.

(4) It should be of low cost.

SUMMARY OF THE INVENTION

An object of the present invention is to provide an AC variable speed driving apparatus, which is highly efficient in a wide speed range, having high output power, easy to cool, and inexpensive, as well as having redundancy against faults in an inverter, by combining an inverter and a motor comprising an induction motor and a synchronous motor.

Another object of the present invention is to provide an electric system for an electric vehicle which is highly efficient, small in size and light, and of low cost.

Still another object of the present invention is to provide an AC variable speed driving apparatus which can detect the magnetic position of the rotor of a motor, which incorporates as its integral part a permanent magnet synchronous motor and an induction motor, without using a sensor in order to control the rotation speed, that is, which can perform sensorless drive, by a simple circuit.

In a first aspect of the present invention, there is provided an AC variable speed driving apparatus including an AC motor and an inverter which drives the AC motor, the AC motor comprising:
an axis of rotation;
a first rotor which includes a permanent magnet, and is mounted on the axis of rotation;
first stator windings constituting a synchronous motor in conjunction with the first rotor;
a second rotor which is mounted on the axis of rotation; and
second stator windings constituting an induction motor in conjunction with the second rotor, the first and second stator windings being disposed in a manner that they do not magnetically interfere with each other;
wherein the inverter supplies the first and second stator windings with AC power independently, thereby driving the synchronous motor and the induction motor separately.

Here, the inverter may comprise a first inverter which is connected to a DC power supply via a first disconnecting switch, and is used to drive the synchronous motor, and a second inverter which is connected to the DC power supply via a second disconnecting switch, and is used to drive the induction motor.

The number of poles of the synchronous motor may equal that of the induction motor, and the first stator windings and the second stator windings may be shifted in a direction of rotation of the first and second rotors by a predetermined electric angle.

The AC variable speed driving apparatus may further comprise torque control means for controlling the synchronous motor and the induction motor via the inverter, the torque control means performing on the synchronous motor a constant torque control in which constant torque is outputted in an entire speed range, and on the induction motor a constant torque control in a range below a predetermined speed, and a flux weakening control in a range above the predetermined speed, an output torque of the AC motor being the sum of output torque of the synchronous motor and output torque of the induction motor.

The synchronous motor may have larger overload capacity in low and middle speed ranges than in a high speed range.

A torque command value $\tau_s^*$ of the synchronous motor and a torque command value $\tau_i^*$ of the induction motor may be determined as follows where $\tau^*$ is a total torque command value of the AC motor, and $\tau_{smax}$ is a maximum output torque of the synchronous motor:

(1) $\tau_s^* = \tau^*$, and $\tau_i^* = 0$, when $\tau^* \leq \tau_{smax}$; and (2) $\tau_s^* = \tau_{smax}$, and $\tau_i^* = \tau^* - \tau_{smax}$, when $\tau^* > \tau_{smax}$.

A torque command value $\tau_s^*$ of the synchronous motor and a torque command value $\tau_i^*$ of the induction motor may be determined as follows where $\tau^*$ is a total torque command value of the AC motor, $\tau_{scont}$ is continuous rating torque of the synchronous motor, $\tau_{icont}$ is continuous rating torque of the induction motor, and $\tau_{smax}$ is a maximum output torque of the synchronous motor:

(1) when $\tau^* \leq \tau_{scont}$, $\tau_s^* = \tau^*$, and $\tau_i^* = 0$;

(2) when $\tau_{scont} < \tau^* \leq \tau_{scont} + \tau_{icont}$, $\tau_s^* = \tau_{scont}$, and $\tau_i^* = \tau^* - \tau_{scont}$;

(3) when $\tau_{scont} + \tau_{icont} < \tau^* \leq \tau_{smax} + \tau_{icont}$, $\tau_s^* = \tau^* - \tau_{icont}$, and $\tau_i^* = \tau_{icont}$; and (4) when $\tau^* > \tau_{smax} + \tau_{icont}$, $\tau_s^* = \tau_{smax}$, and $\tau_i^* = \tau^* - \tau_{smax}$.

The AC variable speed driving apparatus may further comprise a filter circuit to which the torque command value $\tau_i^*$ of the induction motor is inputted, the filter circuit having a time constant sufficiently larger than a secondary circuit time constant of the induction motor, wherein an exciting current supplied to the induction motor is stopped when the torque command value $\tau_i^*$ after passing through the filter is substantially zero.

In a second aspect of the present invention, there is provided an electric system for an electric vehicle comprising:

a first battery;

a second battery;

an AC motor for driving wheels of the electric vehicle, the AC motor including a synchronous motor and an induction motor;

a first inverter connected between the first battery and the synchronous motor; and a second inverter connected between the second battery and the induction motor.

The synchronous motor and the induction motor may have a common axis of rotation.

The synchronous motor and the induction motor may be separately constructed, and wherein the first battery, the first inverter and the synchronous motor may constitute a first main system, and the second battery, the second inverter and the induction motor may constitute a second main system.

The synchronous motor may comprise a permanent magnet rotor.

The first battery may have greater energy density or greater energy than the second battery, and the second battery may have greater output power density or greater output power than the first battery.

Only the synchronous motor may be operated in a low output range, and only the induction motor or both the synchronous motor and induction motor may be operated in a high output range.

In a third aspect of the present invention, there is provided an AC variable speed driving apparatus comprising:

an AC motor including a first rotor which has a permanent magnet and is mounted on a rotor shaft, a second rotor which is mounted on the rotor shaft, and first stator windings and second stator windings which are disposed in a manner such that they do not magnetically interfere with each other, and that they correspond to the first rotor and the second rotor, respectively, the first rotor and the first stator windings constituting a synchronous motor, and the second rotor and the second stator windings constituting an induction motor, the synchronous motor and the induction motor being integrally constructed into one body;

an inverter supplying the first stator windings and the second stator windings with AC power, independently;

first computing means for computing a rotation speed of the first rotor on the basis of actual values of voltages and currents of the synchronous motor or on the basis of command values of voltages and currents of the synchronous motor; and control means for controlling the induction motor by using the rotation speed computed by the first computing means as a feedback value corresponding to the speed of the induction motor.

The AC variable speed driving apparatus may further comprise second computing means for computing command values of voltages or currents to be supplied to the second stator windings by using secondary flux command values and a torque command value to the induction motor, and electric constants of the induction motor, wherein the first computing means computes a magnetic position of the first rotor or a rotation speed of the first rotor on the basis of actual values of voltages and currents of the synchronous motor or on the basis of command values of voltages and currents of the synchronous motor, and the second computing means uses the magnetic position of the first rotor or the rotation speed of the first rotor outputted from the first computing means as a position or a speed signal of the rotor of the induction motor.

The AC variable speed driving apparatus may further comprise a command circuit which outputs to the induction motor voltage command values that have a predetermined voltage-to-frequency ratio and is used to drive only the induction motor during a starting time period of the induction motor, and switching means for switching command values to be supplied to the induction motor, from the voltage command values to current command values computed on the basis of the torque command value, after a predetermined time has elapsed from the start of the induction motor, or after the induction motor has reached a predetermined speed.

In a forth aspect of the present invention, an electric vehicle driving apparatus comprising:

an AC motor including a permanent magnet synchronous motor and an induction motor which are integrally constructed into a single body, the synchronous motor having a rotor including a permanent magnet, and the synchronous motor and the induction motor having a common axis of rotation joined to a shaft for driving one or more wheels;

a first inverter supplying AC power to windings of the synchronous motor;

a second inverter supplying AC power to windings of the induction motor;

a main battery supplying the first inverter and the second inverter with a DC voltage;

first disconnecting means for electrically disconnecting the first inverter from the main battery;

second disconnecting means for electrically disconnecting the second inverter from the main battery; and third disconnecting means connected to AC output lines of the first inverter for electrically disconnecting the synchronous motor from the first inverter.

The electric vehicle driving apparatus may further comprise means for connecting the AC output lines of the first inverter, which is electrically disconnected from the synchronous motor by the third disconnecting means, to an external AC power supply so that the main battery is charged through the inverter.

According to the first aspect of the present invention, the AC motor which is driven by the inverter comprises a permanent magnet synchronous motor and an induction motor, which have a common axis of rotation. As a result, in applying the AC variable speed driving apparatus of the present invention to the driving of an electric vehicle, the capacity of each motor can be reduced in such a way that both synchronous motor and induction motor are used to accelerate the vehicle when the maximum output power is required as in the maximum acceleration of the vehicle. Furthermore, the total efficiency of the system can be improved by using the synchronous motor prior to the induction motor when a constant output power is required as in the crusing speed driving which occupies a large part of the driving pattern of the vehicle.

According to the second aspect of the present invention, since the synchronous motor and the induction motor can be driven independently, only the induction motor or both synchronous motor and induction motor are operated when a high output power is required as in the acceleration of the vehicle. Generally, such an operation mode occupies only a small part of the operation. In contrast, only the synchronous motor is operated in a low output range as driving on a flat road. As a result, high output power is obtained during acceleration, whereas high efficiency is achieved in the low output power range. In addition, the availability of batteries can be improved by employing different types of batteries such as a high energy type or a high output type in accordance with the types of motors, and by changing modes of using the motor and battery in accordance with the speed range.

According to the third aspect of the present invention, the AC motor, integrally constructed of a synchronous motor and an induction motor by mounting the motors on a common rotor shaft, is controlled on the basis of the speed difference between the desired and the actual speed values. The actual speed of the AC motor is detected by a position-speed computing circuit that computes the speed from the detected voltage and current or from the desired voltage and current of the synchronous motor. And the detected speed is fed back to the control loops for the synchronous and the induction motors. The position-speed computing circuit also detects the actual magnetic position of the rotor on the basis of the voltage and current of the synchronous motor. The detected magnetic position of the rotor is employed in the vector control of the synchronous motor. Thus, according to the third aspect of the present invention, sensorless control of the AC motor is realized in which the AC motor is driven on the basis of the desired speed by the aid of the position-speed computing circuit and the vector control of the synchronous and the induction motors.

According to the fourth aspect of the present invention, even if the inverter that drives the permanent magnet synchronous motor fails, the motor disconnecting means can prevent the velocity electromotive force generated in the synchronous motor from being applied to the inverter by breaking the electric connection between the inverter and the synchronous motor. In addition, by connecting an external power supply to the AC output side of the inverter, with the inverter being disconnected from the permanent magnet synchronous motor by the motor disconnecting means, DC power is supplied from the external AC power supply to the main battery through the freewheeling diodes of the inverter and the DC disconnecting means, thereby charging the main battery.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 5:
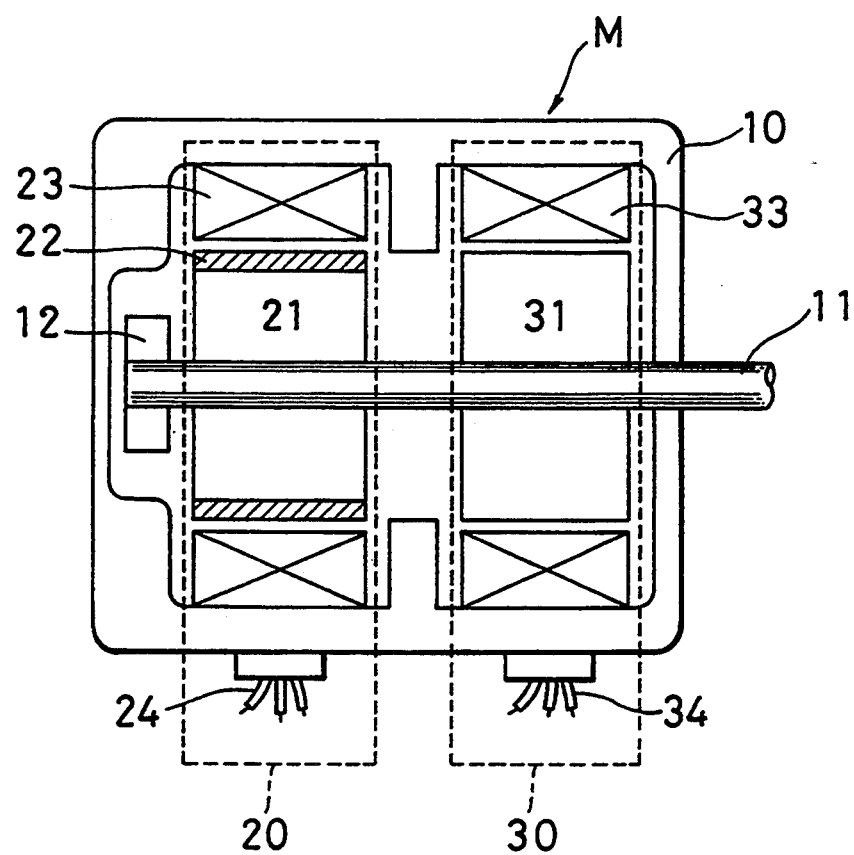
FIG. 5 is a longitudinal sectional view of an AC motor used in a first embodiment in accordance with the present invent ion.

FIG. 5 shows the construction of an AC motor M used in a first embodiment in accordance with the present invention.

In the AC motor M, the reference numeral 10 designates a frame in which a permanent magnet synchronous motor 20 and an induction motor 30 are incorporated having a common axis of rotation 11. In addition, a rotary sensor 12 is attached to an end portion of the axis of rotation 11. The rotary sensor 12 detects the speed and position of the axis of rotation 11, which are used by the motors 20 and 30.

The permanent magnet synchronous motor 20 comprises a first rotor 21 which includes permanent magnets 22 attached to the surface of its poles, three phase windings 23 as first stator windings, and three phase terminals 24 connected to an inverter.

The induction motor 30 comprises a second rotor (a squirrel-cage rotor) 31 containing conductors formed in a cage, three phase stator windings 33 as second stator windings, and three phase terminals 34 connected to another inverter.

Figure 6:
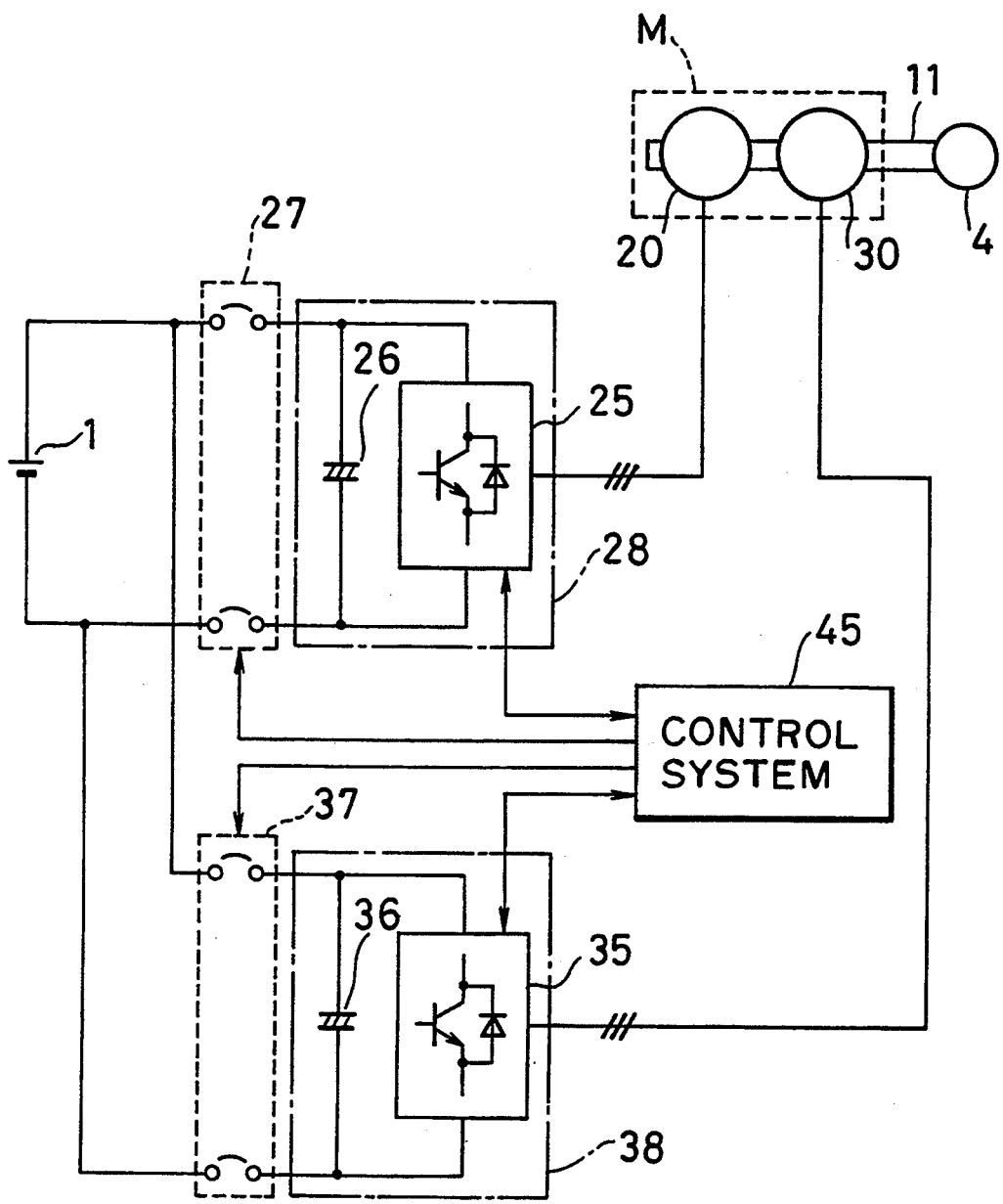
FIG. 6 is a block diagram showing a driving circuit of the AC motor in the first embodiment.

FIG. 6 shows a driving circuit of the AC motor M.

In FIG. 6, the main battery 1 is connected to voltage type inverters 28 and 38 through DC disconnecting switches 27 and 37, respectively. Each disconnecting switch is composed of a breaker or the like. The inverters 28 and 38 comprise electrolytic capacitors 26 and 36, and semiconductor device groups 25 and 35, respectively. The capacitors 26 and 36 function as filters for removing spikes on the DC voltage caused by harmonic currents generated by the inverters 28 and 38. Since the configuration of the semiconductor device group 25 or 35 of the voltage type inverter is known in the art, the description thereof is omitted here.

The AC output terminals of the inverter 28 are connected to the stator windings 23 via the terminals 24 of the permanent magnet synchronous motor 20, and the output terminals of the inverter 38 are connected to the stator windings 33 via the terminals 34 of the induction motor 30.

Not only in voltage type inverters but also in any electric power converters that employ semiconductor devices, in general, various quantities such as currents, voltages, temperatures and the like may exceed allowable values because of an overload, an overvoltage, noise, misoperation, heat, oscillation or the like. Although various protective functions are added in order to prevent the devices from being damaged, they can never be perfect, and hence some devices might be damaged in the worst case.

In particular, when a voltage source is employed as a power supply as shown in FIG. 6, the voltage source might be short-circuited in which case damage is caused such that the semiconductor devices, are short-circuited. This might result in a fault in the entire apparatus.

To prevent such a problem, when a fault in a semiconductor device or a fault which might lead to damage of a semiconductor device is detected in the inverter 28 or 38, the disconnecting switch 27 or 37 is opened by a control system 45 so that the main battery 1 and an unimpaired inverter are protected.

In such a case, the disconnecting switch 27 or 37 connected to the unimpaired inverter may be closed again if necessary so that the motor 20 or 30 will continue to rotate the AC motor M.

Figure 7A:
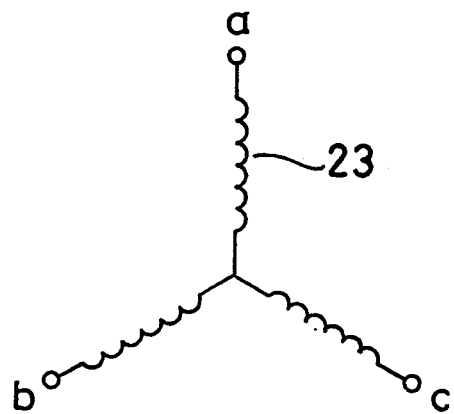
FIGS. 7A and 7B are diagrams illustrating the stator windings of a synchronous motor and an induction motor, respectively, in the first embodiment.
Figure 7B:
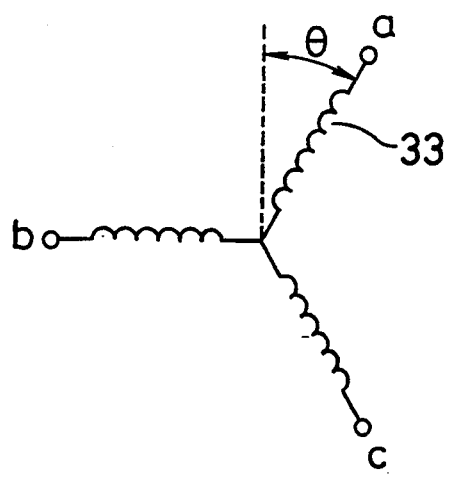

Next, the arrangement of the stator windings 23 and 33 of the motor 20 and 30 will be explained with reference to FIGS. 7A and 7B. FIG. 7A shows the stator windings 23 of the synchronous motor 20, and FIG. 7B shows the stator windings 33 of the induction motor 30. The windings 23 and 33 are shifted by a predetermined electrical angle $\theta$.

The number of poles of the motor 20 and 30 are supposed to be identical.

Although the waveforms of currents flowing through the windings 23 or 33 may vary in accordance with a control method of the inverter 28 or 38, the voltage type square waveform inverter includes in its voltage waveform a large amount of fifth and seventh harmonics of the fundamental frequency. In general, the output voltage of the inverter is modulated by the PWM technique known in the art. Although this method will remove low-order harmonics, higher order harmonics will not be completely removed unless the modulation frequency is set at a sufficiently high value.

In addition, the dead time, which is set in the voltage type inverter to prevent a short-circuit between the semiconductor devices of the upper and lower arms in each phase, will cause a distortion in the output voltage.

Thus, fifth, seventh, eleventh, thirteenth . . . harmonics are usually included in the input current to the AC motor driven by the inverter. In particular, the fifth and seventh harmonic currents cause torque ripples whose frequency is six times the applied frequency. This causes not only rotation distortion, but also strange sounds in the driving system of an electric vehicle which comprises a great number of gears and the like, and shortens the life of the system, as well.

For this reason, the stator windings 23 and 33 of the motor 20 and 30 are displaced by an electrical angle $\theta$ as shown in FIGS. 7A and 7B, and the phases of the voltages or currents supplied to the windings 23 and 33 are also shifted by $\theta$. This makes it possible to shift the phases of the torque ripples which are generated in both motors 20 and 30.

For example, considering the ripples whose frequency is six times the fundamental frequency, the shift angle of $\theta = 30°$ (electrical angle) will double the frequency of the torque ripples synthesized, and can reduce the amplitude thereof. Thus, the adverse effect of the rotation distortion and the torque ripples on the mechanical system can be reduced.

Figure 8A:
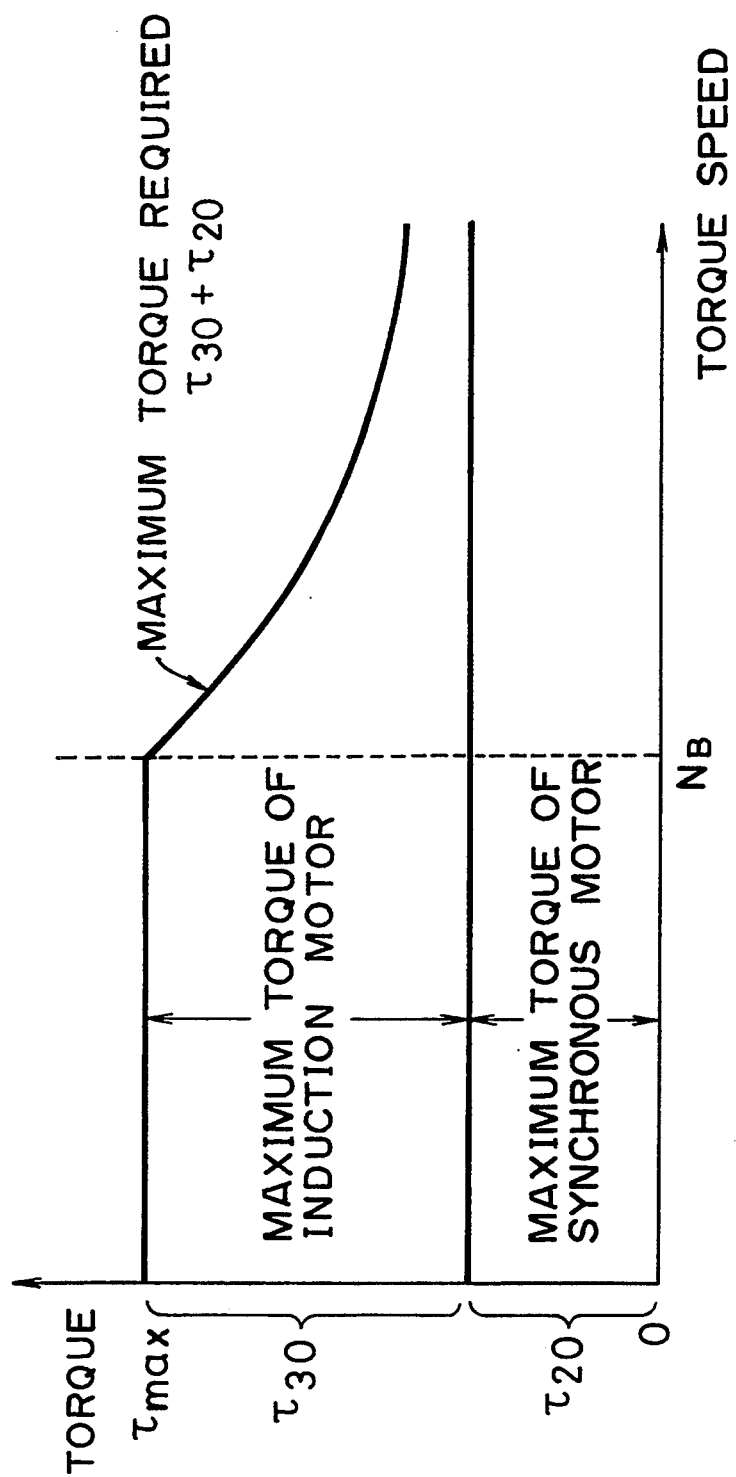
FIG. 8A is a graph illustrating speed-torque characteristics of the motors in the first embodiment.

FIG. 8A illustrates the relationship between the maximum torque and speed that is required of the motors 20 and 30 and the driving system of the electric vehicle.

In general, the maximum torque required by the electric vehicle exhibits constant torque characteristics in the range less than a certain speed (fundamental speed) $N_B$, whereas it shows constant output power characteristics in the range above $N_B$, wherein the torque is inversely proportional to the speed.

Since the permanent magnet synchronous motor has a constant magnetic flux, it is supposed that the synchronous motor has a constant torque characteristic in the entire speed range, and that the value of the constant torque is less than the required torque at the maximum speed. Accordingly, in designing the synchronous motor and the inverter that drives it, the maximum output torque of the synchronous motor may be determined to take such a value as $\tau_{20}$ of FIG. 8A.

In contrast, the output torque required of the induction motor is the difference $\tau_{30}$ between the maximum torque and the constant torque that the synchronous motor can provide.

When the maximum torque required is inversely proportional to the speed in the high speed range as shown in FIG. 8A, the maximum torque of the induction motor can be approximated as inversely proportional to the square of the speed. In this case, the voltage applied to the induction motor may be constant in the range of magnetic flux weakening control, that is, in the range beyond $N_B$. Therefore, the maximum output voltage of the inverter can be set at the voltage corresponding to the fundamental speed $N_B$.

Thus, the rated voltage of the induction motor at $N_B$ can be selected at a high value. This makes it possible to decrease the current to produce the required torque, and hence to reduce the copper loss, which presents an advantage in that the total efficiency is improved.

Figure 8B:
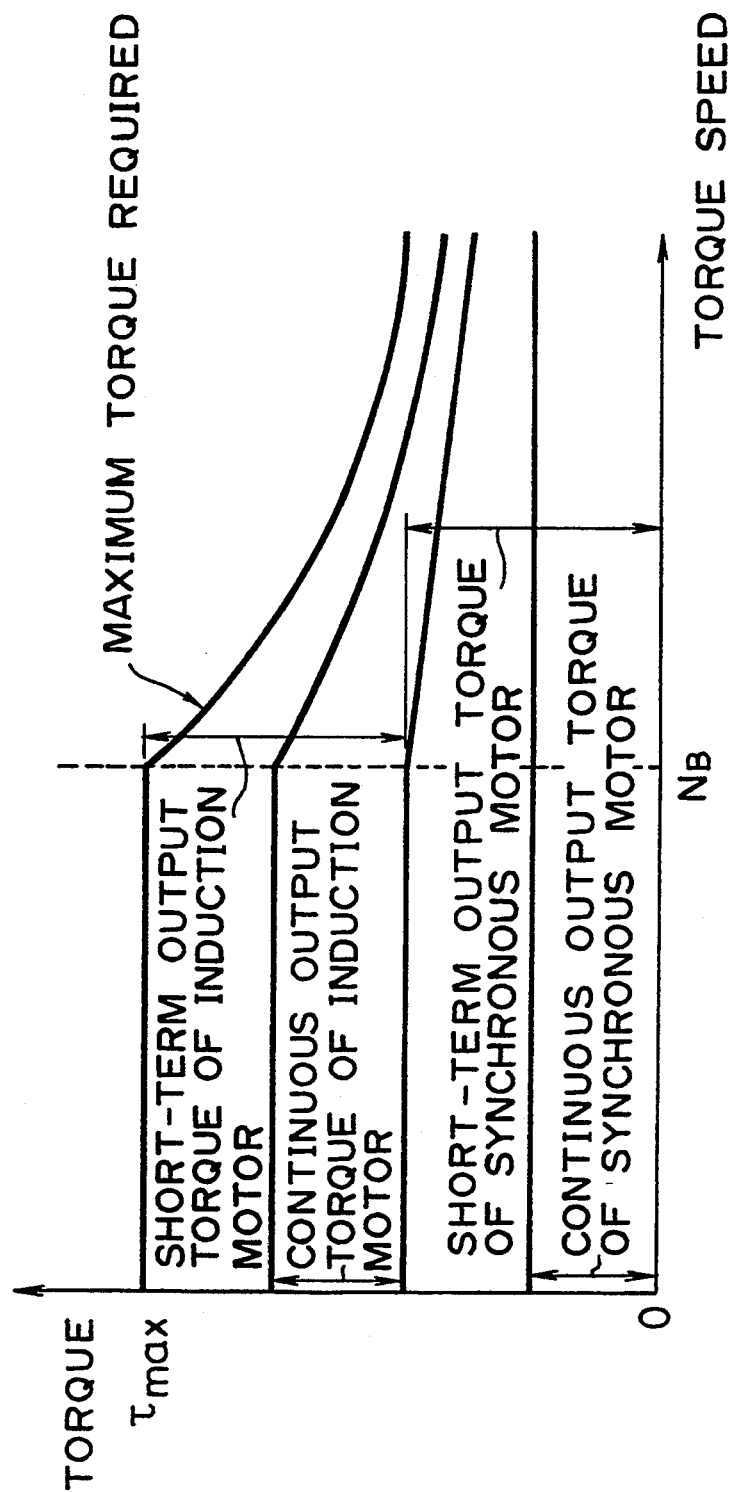
FIG. 8B is a graph illustrating speed-torque characteristics of the motors when short-term ratings are defined in the first embodiment.

FIG. 8B also illustrates the relationships between the maximum torque and speed that is required of the motors 20 and 30 and the driving system of the electric vehicle.

The maximum torque required by an electric vehicle has, in general, characteristics as shown in FIGS. 8A and 8B. Such maximum torque, however, is required for a relatively short time such as during passing. Usually, the torque required during the cruising speed driving is less than half the maximum torque.

In the driving system comprising the motor and the inverter, the size, weight and cost thereof, particularly those of the cooling device vary depending on the selected rate of the continuous output torque to the short term output torque for each of the motor, even when the required maximum torque is identical.

Accordingly, short term ratings are defined in a manner that the overload capacity of the permanent magnet synchronous motor in the high speed range is set less than that in the low and middle speed ranges as shown in FIG. 8B. The benefit of this will be described referring to FIGS. 9A and 9B.

Figure 9A:
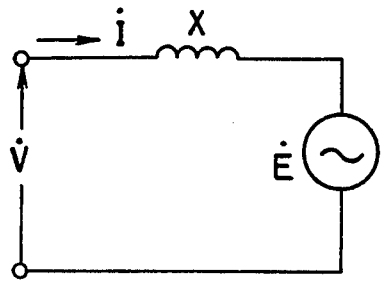
FIG. 9A is an equivalent circuit of the synchronous motor employed in the first embodiment.
Figure 9B:
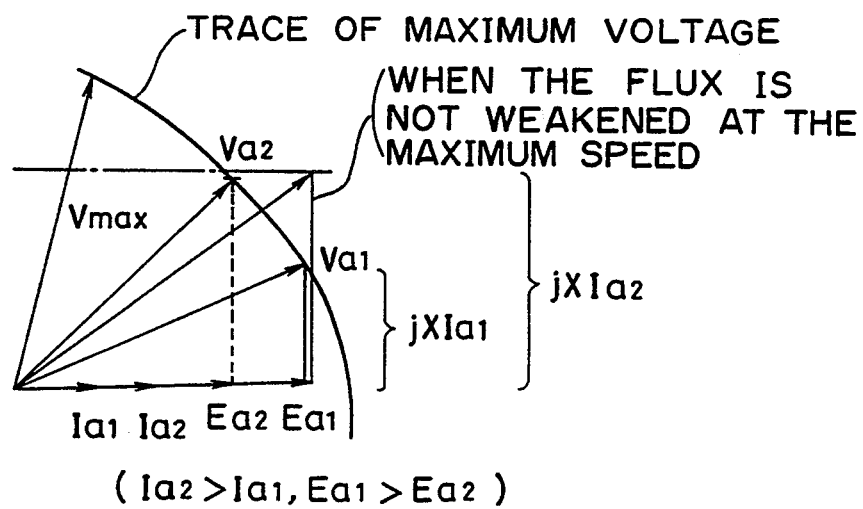
FIG. 9B is a vector diagram of the synchronous motor of FIG. 9A.

FIG. 9A shows an equivalent circuit of a synchronous motor, and FIG. 9B shows a vector diagram thereof. The equivalent circuit shows that the synchronous motor can be approximated by the counter-electromotive force vector E (the dot to be attached over the top of the character E will be omitted in the specification for the purpose of convenience), and the synchronous reactance X. This is particularly so in the high speed range. In this figure, the voltage vector V of the motor (which is equal to the applied voltage vector) and the current vector I are also shown.

Generally speaking, in controlling the permanent magnet synchronous motor, the current vector I is controlled to coincide in phase with the counter-electromotive force E so that the amplitude of the current vector I is proportional to the torque. That is, the synchronous motor outputs torque in proportion to the current flowing through the motor. FIG. 9B shows the vector diagram in such a case. If we want to use a synchronous motor with high efficiency, the counter-electromotive force of the motor should be increased. If we assume in FIG. 9B that the counter-electromotive force $E_{a1}$ is generated at the maximum speed of the synchronous motor by applying the terminal voltage $V_{a1}$ corresponding to the maximum voltage $V_{max}$ which the inverter can output, and that the current $I_{a1}$ flows through the synchronous motor by the application of the voltage $V_{a1}$, we can not force a current greater than $I_{a1}$ to flow through the motor. The output torque at the maximum speed is determined by the current $I_{a1}$. If we want to force the current $I_{a2}$ greater than $I_{a1}$ to flow through the motor, the counter-electromotive force should be decreased to $E_{a2}$ by weakening the magnetic flux of the motor. This is especially so in the high speed range where the voltage drop, caused by the counter-electromotive force or by the synchronous reactance, increases with the increase in the frequency of the voltage applied to the synchronous motor.

Thus, in the high speed range, increase in the output torque of the synchronous motor causes a shortage of the output voltage from the inverter. If the counter-electromotive force of the synchronous motor is decreased to avoid the shortage of the output voltage from the inverter, the motor current must be increased to a level necessary for generating required torque. This will increase the loss (particularly copper loss), and decrease the efficiency of the synchronous motor.

Figure 9C:
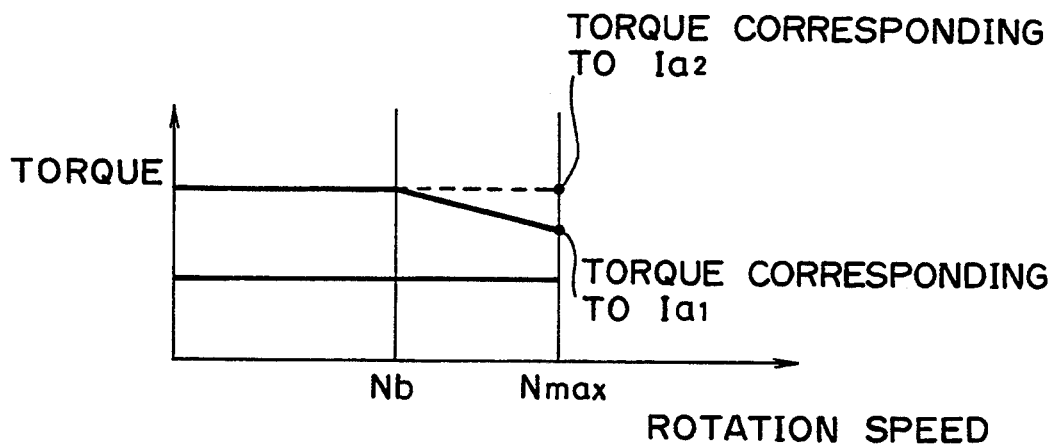
FIG. 9C is a graph illustrating speed-torque characteristics of the synchronous motor of FIG. 9A.

For this reason, the counter-electromotive force E is set as large as possible by reducing the short term output torque, as shown in FIG. 9C, which illustrates speed-torque characteristics in the high speed range, in which the voltage drop is great and the voltage margin is small.

Figure 10:
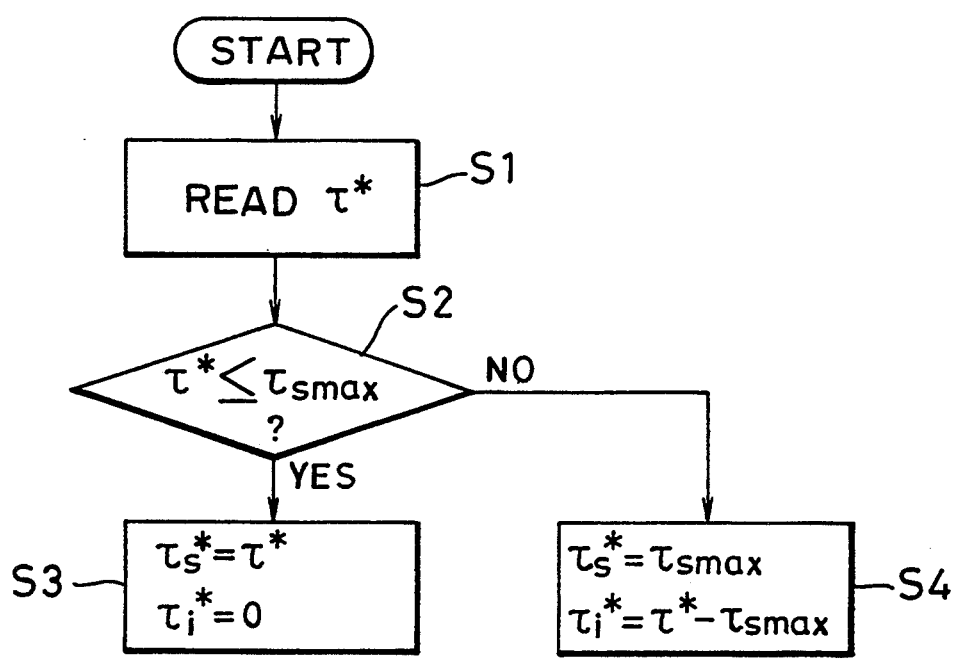
FIG. 10 is a flowchart showing a method for computing torque command values of the permanent magnet synchronous motor and the induction motor in the first embodiment.

FIG. 10 is a flowchart showing a calculation method of the torque command values for the permanent magnet synchronous motor 20 and the induction motor 30. More specifically, the torque command value $\tau_s^*$ of the permanent magnet synchronous motor 20 and the torque command value $\tau_i^*$ of the induction motor 30 are computed from the total torque command value $\tau^*$ supplied to the AC motor M of the electric vehicle.

First, the total torque command value $\tau^*$ is read at step S1, and is compared with the maximum torque $\tau_{smax}$ of the synchronous motor 20 at step S2. If $\tau^* \leq \tau_{smax}$, the torque command value $\tau_s^*$ of the synchronous motor 20 is set equal to the total torque command value $\tau^*$, and the torque command value $\tau_i^*$ of the induction motor 30 is set at zero at step S3.

In contrast, if $\tau^* > \tau_{smax}$, the torque command value $\tau_s^*$ of the synchronous motor 20 is set equal to the maximum value $\tau_{smax}$, and the torque command value $\tau_i^*$ is set equal to the difference $(\tau^* - \tau_{smax})$ between the total torque command value $\tau^*$ and the maximum value $\tau_{smax}$ at step S4.

By such operations, the torque command value for the synchronous motor is determined prior to that of the induction motor, thereby improving the efficiency in the low torque drive.

Figure 11:
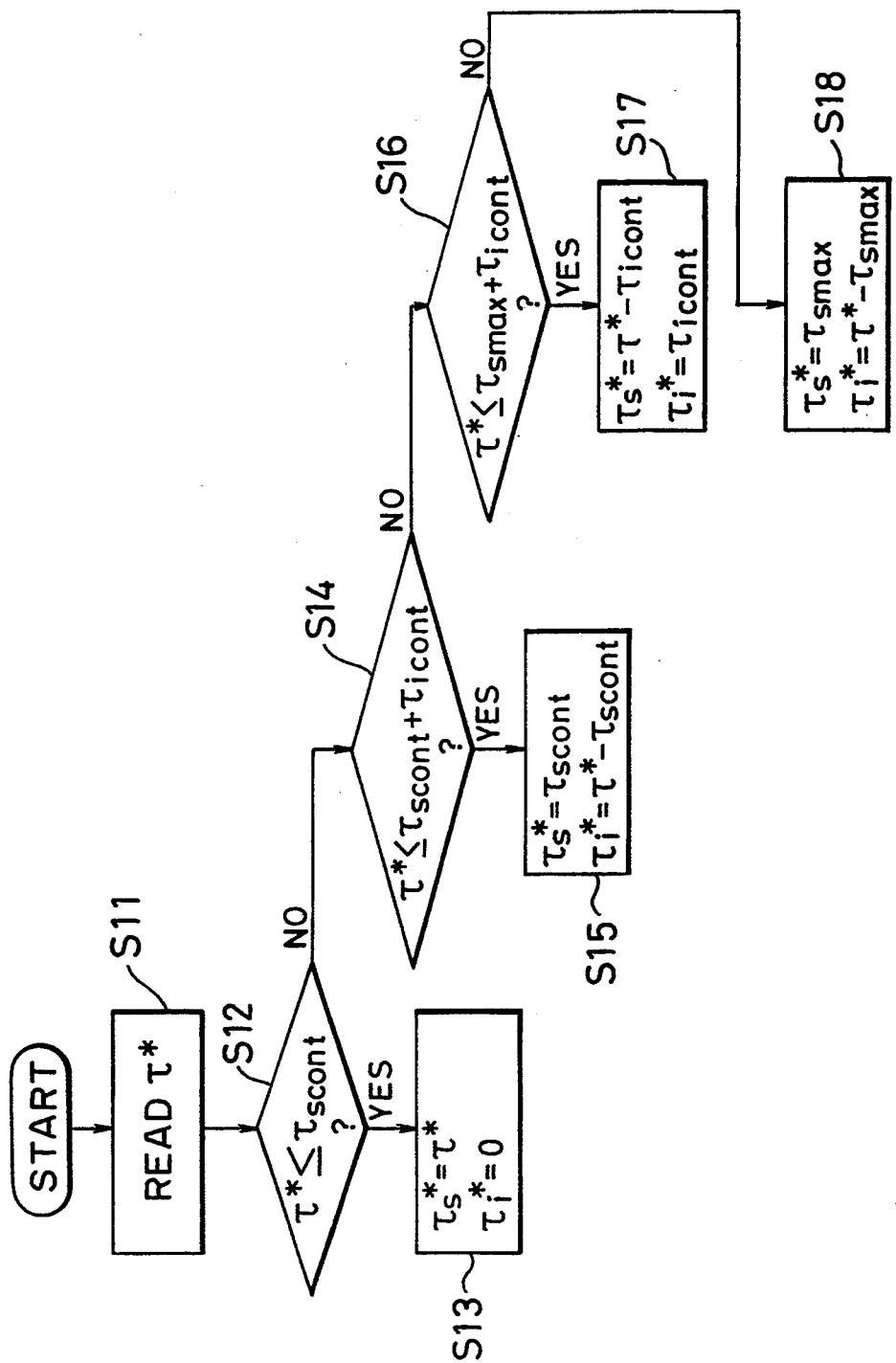
FIG. 11 is a flowchart showing another method for computing torque command values of the permanent magnet synchronous motor and the induction motor in the first embodiment.

FIG. 11 is a flowchart illustrating another method for computing the torque command values to the permanent magnet synchronous motor 20 and the induction motor 30.

In this method, the total torque command value $\tau^*$ is read at step S11, and is compared with the continuous rating torque $\tau_{scont}$ of the synchronous motor 20 at step S12. If $\tau^* \leq \tau_{scont}$, the torque command value $\tau_s^*$ of the synchronous motor 20 is set equal to the total torque command value $\tau^*$, and the torque command value $\tau_i^*$ of the induction motor 30 is set at zero at step S13.

On the other hand, if $\tau^* > \tau_{scont}$, the torque command value $\tau^*$ is compared with the sum of $\tau_{scont}$ and the continuous rating torque $\tau_{icont}$ of the induction motor 30 at step 14. If $\tau^* \leq \tau_{scont} + \tau_{icont}$, the torque command value $\tau_s^*$ of the synchronous motor 20 is set equal to the continuous rating torque $\tau_{scont}$, and the torque command value $\tau_i^*$ of the induction motor 30 is set equal to the difference $(\tau^* - \tau_{scont})$ between the total torque command value $\tau^*$ and the continuous rating torque $\tau_{scont}$ at step S15.

Next, if the torque command value $\tau^*$ satisfies the relationships $\tau^* > \tau_{scont} + \tau_{icont}$ (negative at step S14), and $\tau^* \leq \tau_{smax} + \tau_{icont}$ (positive at step S16, that is, the torque command value $\tau^*$ is equal to or less than the sum of the maximum torque $\tau_{smax}$ of the synchronous motor 20 and the continuous rating torque $\tau_{icont}$ of the induction motor 30), the torque command value $\tau_s^*$ of the synchronous motor 20 is set at the difference $(\tau^* - \tau_{icont})$ between the total torque command value $\tau^*$ and the continuous rating torque $\tau_{icont}$ of the induction motor 30, and the torque command value $\tau_i^*$ of the induction motor 30 is set at the continuous rating torque $\tau_{icont}$ at step S17.

Furthermore, if $\tau^* > \tau_{smax} + \tau_{icont}$ (negative at step S16), the torque command value $\tau_s^*$ of the synchronous motor 20 is set at the maximum torque $\tau_{smax}$, and the torque command value $\tau_i^*$ of the induction motor 30 is set at the difference $(\tau^* - \tau_{smax})$ between the total torque command value $\tau^*$ and the maximum torque $\tau_{smax}$ of the synchronous motor 20 at step S18.

Thus determining the torque command values $\tau_s^*$ and $\tau_i^*$ makes it possible to realize efficient driving because the synchronous motor 20 is used prior to the induction motor 30 in the continuous rating ranges of the motors 20 and 30, and in the overload ranges and their borders.

Figure 12:
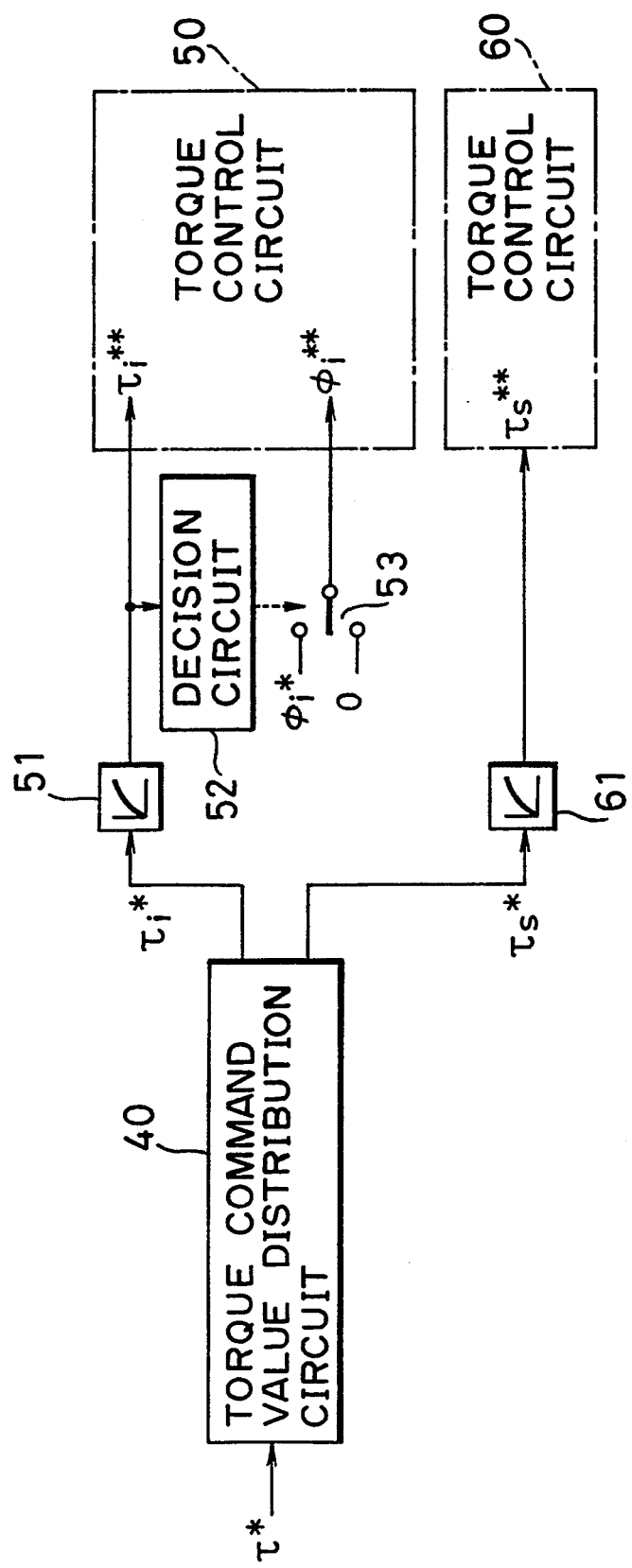
FIG. 12 is a block diagram showing an arrangement of a torque control apparatus of the synchronous motor and the induction motor of the first embodiment.

FIG. 12 shows an arrangement of a torque control system for the motors 20 and 30.

The torque control system shown in FIG. 12 comprises a torque command value distribution circuit 40, filter circuits 51 and 61, and torque control circuits 50 and 60. The torque command value distribution circuit 40 computes the torque command values $\tau_s^*$ and $\tau_i^*$ on the basis of the total torque command values $\tau^*$ in accordance with the flowchart of FIG. 10 or FIG. 11. The filters 51 and 61 remove high frequency components from the torque command values $\tau_s^*$ and $\tau_i^*$ produced by the distribution circuit 40. The torque control circuits 50 and 60 control the torque of the motors 20 and 30 in accordance with the torque command values $\tau_s^*$ and $\tau_i^*$, respectively. The control method of the torque control circuits 50 and 60 is known in the art, and hence details thereof are omitted here.

The torque command value $\tau_i^*$ of the induction motor 30 passing through the filter circuit 51 is obtained as the torque command value $\tau_i^{}$ at the output of the filter circuit 51. This command value $\tau_i^{}$ is inputted to a decision circuit 52 that judges whether the value of the command value $\tau_i^{}$ is zero or not. A switch 53 operates in response to the result of the decision such that a flux command value $\phi_i^{}$ is set at a predetermined value $\phi_i^*$ or at zero.

According to the method describe above, in the range where the total torque command value $\tau^*$ is rather small, the electric vehicle is driven only by the synchronous motor 20 which requires no exciting current, and the induction motor 30 is not used. As a result, the iron loss and copper loss of the induction motor 30 are kept zero in that range. Thus, highly efficient driving is realized.

In addition, it is easy to prevent transitional torque fluctuations which might occur in the switching of the flux, by setting the time constant of the filter circuit 51 larger than the time constant of the equivalent second circuit of the induction motor. This is possible because the response time of the torque of the electric vehicle can be set much greater than the second-order time constant of the equivalent second circuit of the induction motor.

Although the AC motor M comprises a single synchronous motor 20 and a single induction motor 30 mounted on the common axis of rotation 11 in the embodiment described above, the AC motor M may comprise two or more pairs of a synchronous motor and an induction motor.

This embodiment has the following advantages.

(1) It can distinguish between the use of a permanent magnet synchronous motor which is highly efficient by nature and the use of an induction motor which is readily subjected to flux-weakening control and has a wide speed control range. As a result, the AC motor and its driving apparatus can be reduced in size and cost to a greater extent than when either a synchronous motor or an induction motor is used individually.

Furthermore, when one of the two inverters fails, the other inverter can drive the motor connected thereto after disconnecting the failed inverter. This redundancy provides the system with high reliability and convenience of operation.

(2) Torque ripples and irregularity of rotation can be reduced by displacing the positional angle of the stator windings of each motor as shown in FIGS. 7A and 7B.

(3) The efficiency of the induction motor can be improved by employing constant torque control for the synchronous motor and a flux-weakening control for the induction motor.

(4) The efficiency of the synchronous motor can be improved by reducing the overload capacity of the synchronous motor in a high-speed range.

(5) The efficiency of the total system in the low torque range can be improved by mainly driving the synchronous motor in that range.

(6) The efficiency in the entire torque range is improved because the torque command value for each motor is computed separately in the continuous rating range and in the overload range.

(7) When the total torque command value is small and only the synchronous motor is driven, and hence the torque command value to the induction motor is zero, the exciting current is not supplied to the induction motor. As a result, the loss of the induction motor can be reduced, and hence the efficiency of the system can be improved. Furthermore, the cooling device of the induction motor can be reduced in capacity.

EMBODIMENT 2

Figure 13:
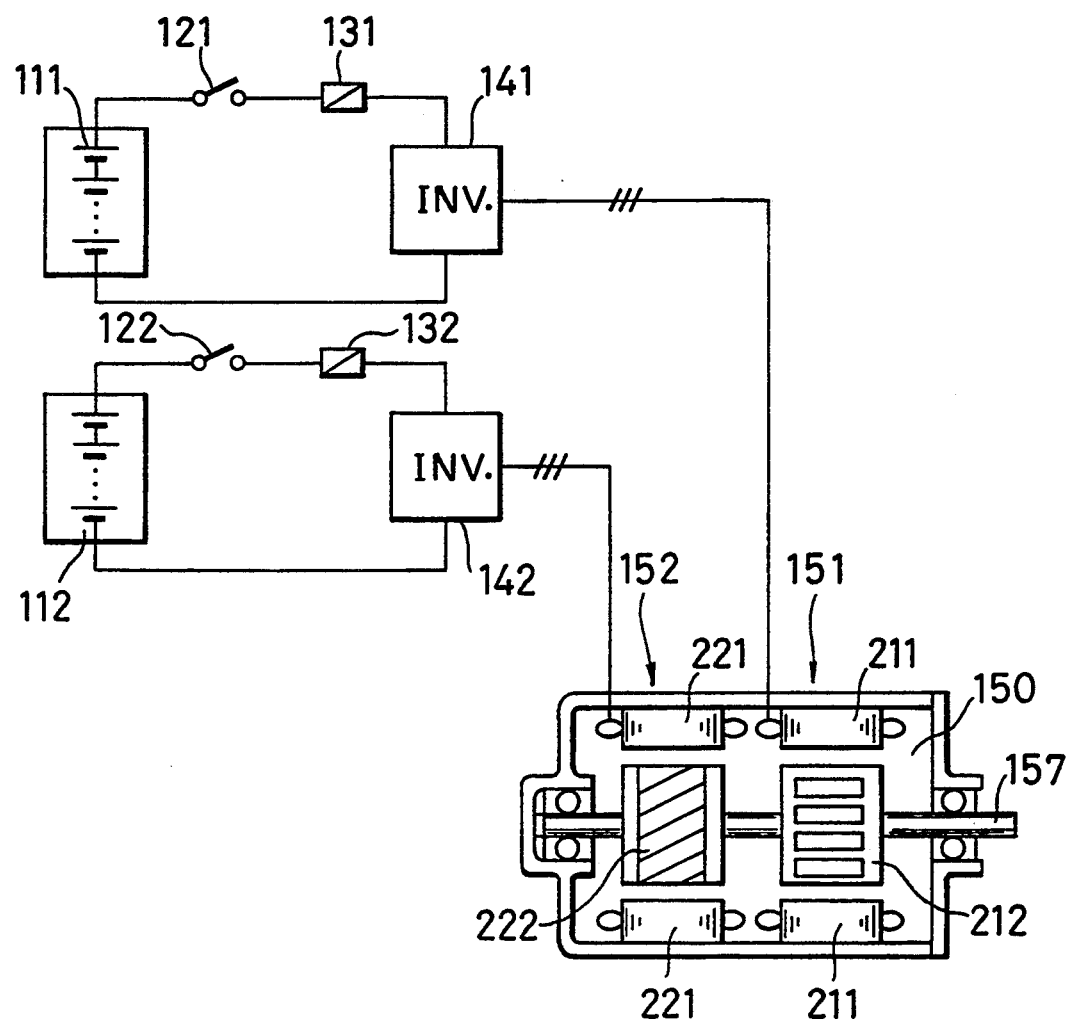
FIG. 13 is a block diagram showing a main portion of a second embodiment in accordance with the present invention.

FIG. 13 shows a second embodiment in accordance with the present invention. This embodiment comprises an AC motor for driving wheels, which includes a synchronous motor and an induction motor. The two motors have a common axis of rotation, and are each connected to driving circuits for separately driving the two motors.

In this figure, reference numerals 111 and 112 designate batteries, which are connected to inverters 141 and 142 via main switches 121 and 122 and fuses 131 and 132, respectively.

A motor 150 comprises a permanent magnet synchronous motor 151 and an induction motor 152 having a common axis of rotation 157. The synchronous motor 151 comprises a stator 211 and a permanent magnet rotor 212. The induction motor 152 comprises a stator 221 and a rotor 222.

The output terminals of the inverter 141 are connected to the stator 211 of the synchronous motor 151, and the output terminals of the inverter 142 are connected to the stator 221 of the induction motor 152.

Figure 1:
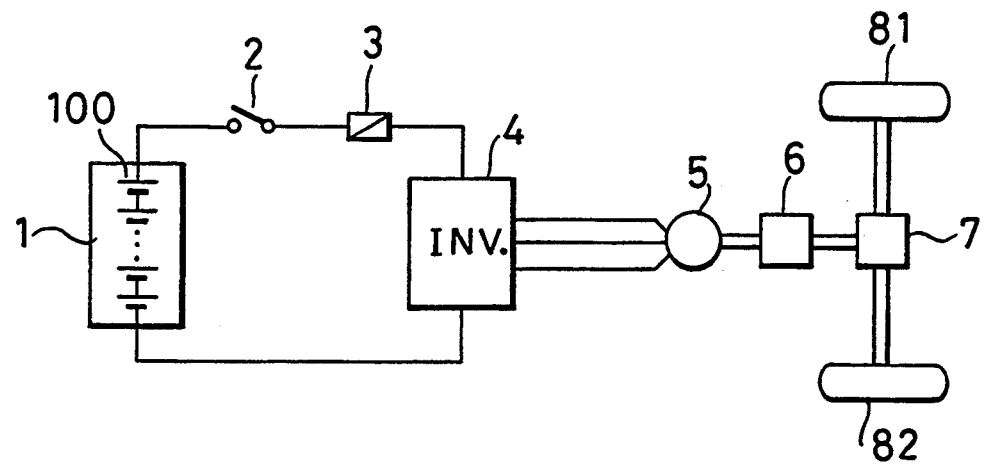
FIG. 1 is a block diagram showing an electric system of a conventional electric vehicle.
Figure 2:
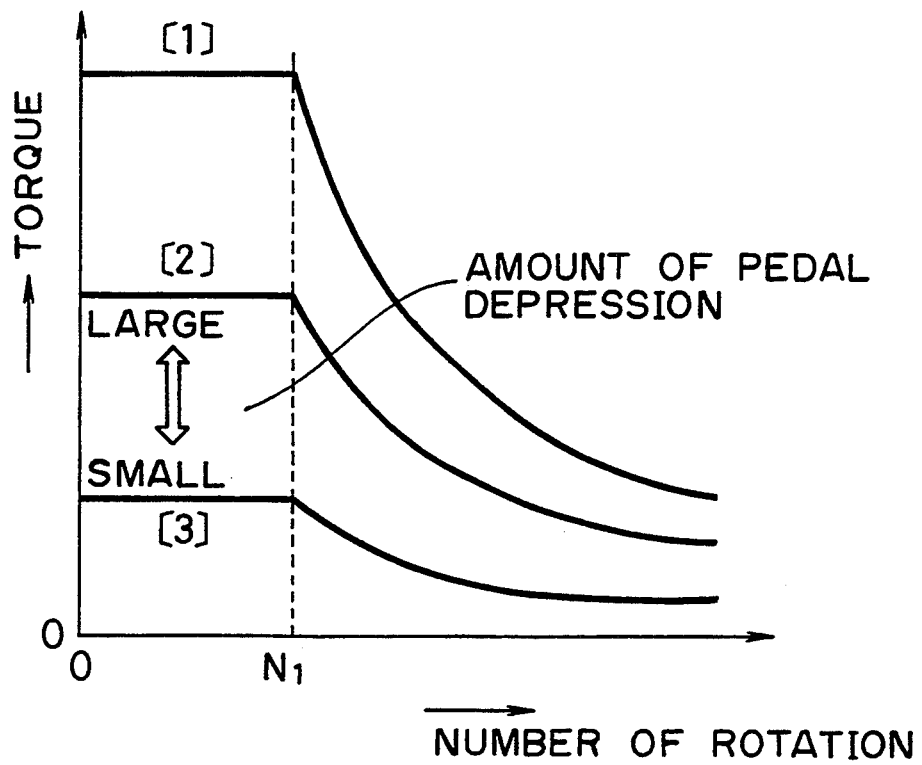
FIG. 2 is a graph illustrating torque-rotation rate characteristics of an AC motor for driving wheels of the electric vehicle.
Figure 3:
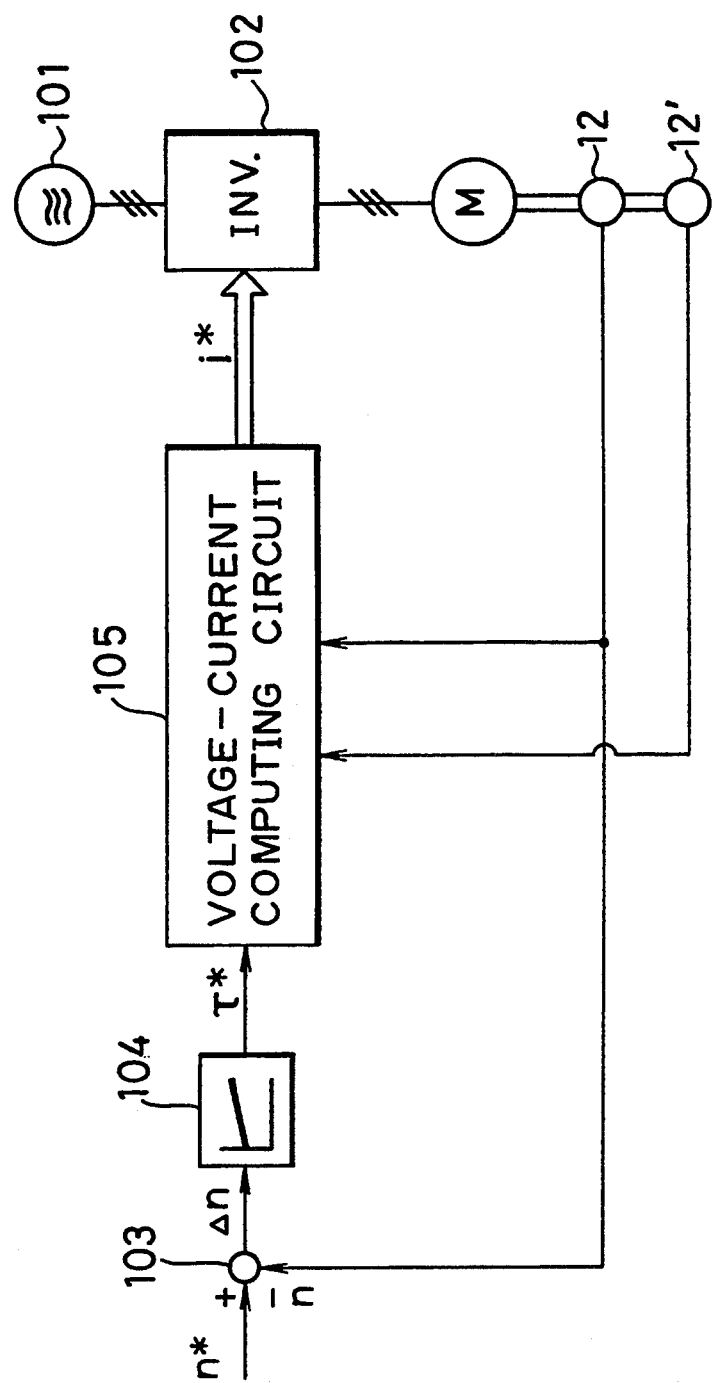
FIG. 3 is a schematic block diagram showing the entire arrangement of a conventional AC variable speed driving apparatus.

The inverter 141 drives the synchronous motor 151 under the control of a control system, and the inverter 142 drives the induction motor 152 under the control of another control system. These control systems are not shown in this figure. Further in this figure, the devices from the reduction gear 6 and onward of FIG. 1 are omitted.

As the battery 111 for driving the synchronous motor, one that has great energy density (Wh/kg) (that is, a high energy type), or great energy (Wh) is employed so that it is suitable for low output power and long time travel.

On the other hand, as the battery 112 for driving the induction motor, one that has great output power density (W/kg) (that is, a high output power type), or great output power (W) so that it is suitable for a short term operation such as acceleration and deceleration.

Figure 14:
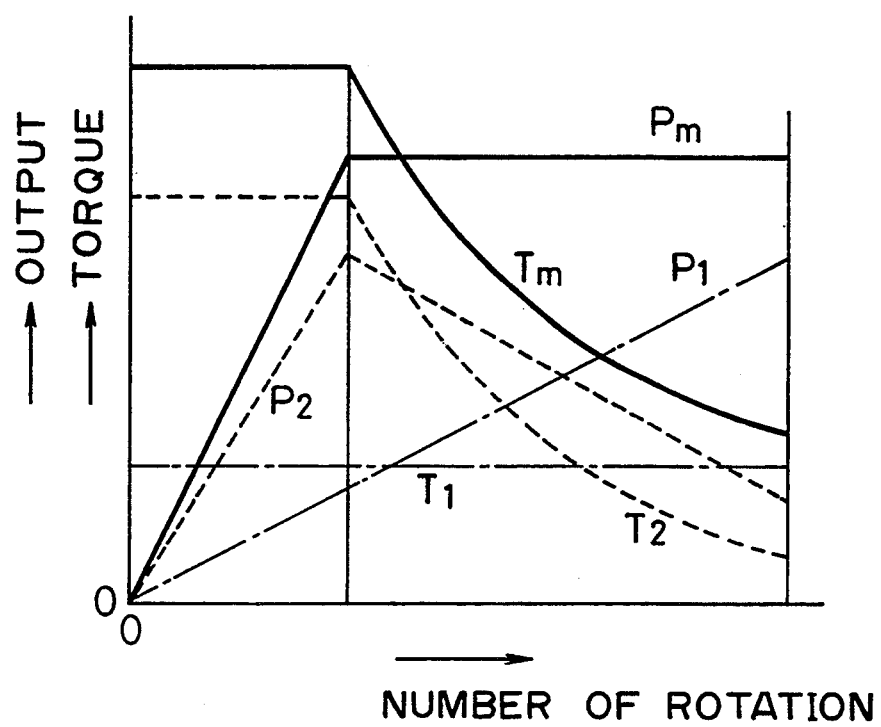
FIG. 14 is a diagram illustrating operation of the second embodiment of FIG. 13.

FIG. 14 illustrates the operation of the electric system of FIG. 13.

In FIG. 14, the solid lines represent the characteristics of the maximum output power operation of the electric vehicle, where Tm denotes torque and Pm designates output power. The dashed-and-dotted lines represent the characteristics of the maximum output power operation of the synchronous motor 151, where $T_1$ designates torque and $P_1$ denotes output power. The broken lines represent the characteristics of the maximum output power operation of the induction motor 152, where $T_2$ indicates torque and $P_2$ denotes output power.

This figure illustrates the load sharing of the motors 151 and 152. The torque $T_1$ is the maximum torque assigned to the synchronous motor 151, and is constant regardless of the rotation rate. Accordingly, the torque exceeding $T_1$ is assigned to the induction motor 152.

In the operation range of the electric vehicle in which the required torque is less than $T_1$, such as in a low output power drive on a normal flat road, the inverter 142 for the induction motor is stopped or the electrical torque of the induction motor is controlled to zero, and only the synchronous motor 151 is used.

When high output power is required as in acceleration and deceleration, only the induction motor 152 is driven, or both synchronous motor 151 and the induction motor 152 are driven.

Since the rotors 212 and 222 of the motors 151 and 152 are mounted on the common rotor shaft 157, the output frequency of the inverter 142 for the induction motor is different from that of the inverter 141 for the synchronous motor 151 by the slip frequency.

The selection of the operation mode from the three modes, that is, a first mode in which only the synchronous motor is driven, a second mode in which only the induction motor is driven, and a third mode in which both synchronous and induction motors are driven, is determined in advance in accordance with the torque value required with respect to each number of revolution. Thus, the inverters 141 and 142 are controlled.

The operation mode is selected in such a manner that the optimum total efficiency of the system is obtained for each operation point. More specifically, an amount of depression of the accelerator pedal is detected, and the inverters 141 and/or 142 are operated in accordance with the required torque value commanded in response to the detected signal in a manner similar to the operation shown in FIG. 10.

EMBODIMENT 3

Figure 15:
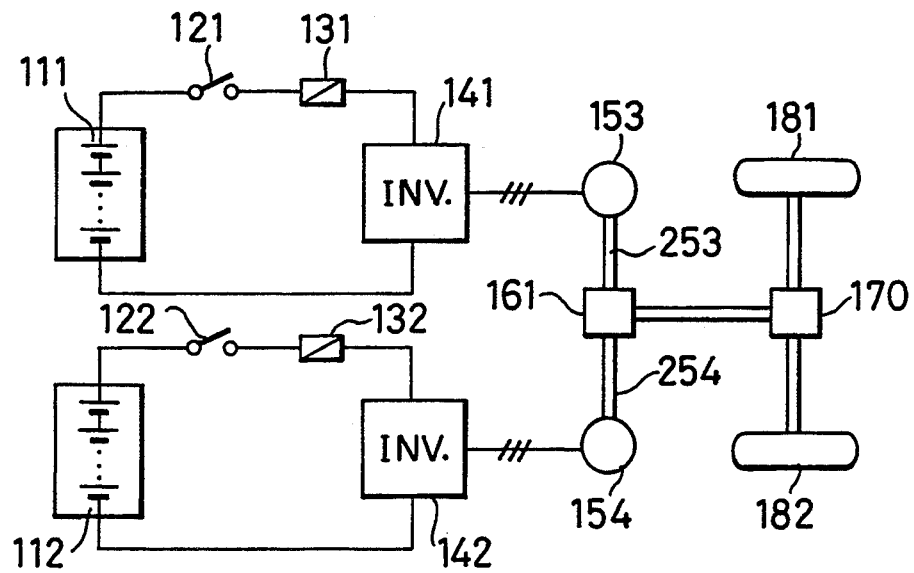
FIG. 15 is a block diagram showing a main portion of a third embodiment in accordance with the present invention.

FIG. 15 shows a third embodiment in accordance with the present invention. In this figure, the same elements are designated by the same reference numerals as in FIG. 13.

The third embodiment comprises a first system including a battery, an inverter and a synchronous motor, and a second system including a battery, an inverter and an induction motor. The third embodiment differs from the second embodiment in that the synchronous motor and the induction motor are separately provided.

More specifically, although in the second embodiment shown in FIG. 13, the two motors 151 and 152 have rotors 212 and 222 which are mounted on the common axis of rotation 157, and are incorporated in a common motor frame, in the third embodiment shown in FIG. 15, the synchronous motor 153 and the induction motor 154 are separately installed, and the axes of rotation 253 and 254 of the motors 153 and 154 are coupled by a reduction gear 161. The axes of rotation 253 and 254 may be joined directly to each other within the reduction gear 161, or be coupled via a gear.

The motors 153 and 154 are controlled in the same manner as the motors 151 and 152 in FIG. 13.

EMBODIMENT 4

Figure 16:
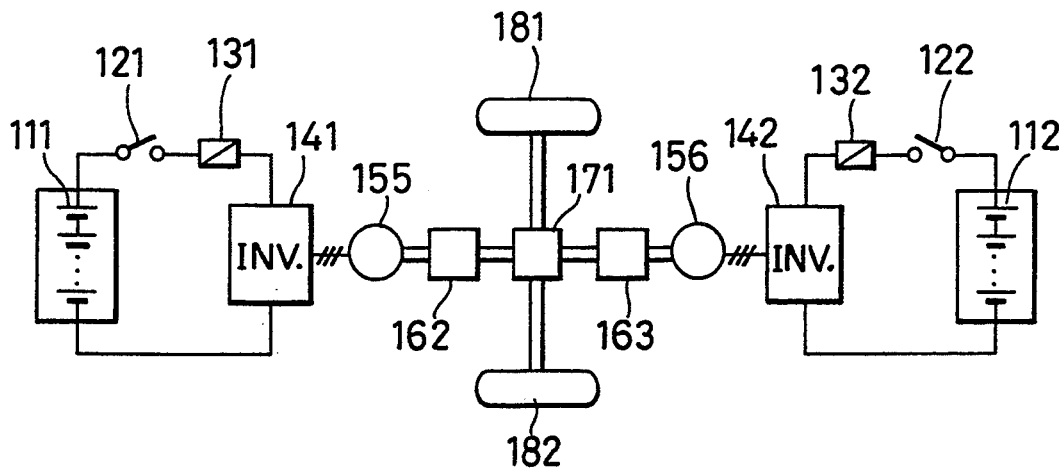
FIG. 16 is a block diagram showing a main portion of a fourth embodiment in accordance with the present invention.

FIG. 16 shows a fourth embodiment in accordance with the present invention. In this figure, the same elements are denoted by the same reference numerals as in FIGS. 13 and 15. The fourth embodiment of FIG. 16 comprises two electric system, one for a synchronous motor and the other for an induction motor.

In FIG. 16, reference numeral 171 denotes a differential gear having two input shafts. Each of the input shafts is joined to each one of reduction gears 162 and 163. The reduction gear 162 is joined to a synchronous motor 155, and the reduction gear 163 is joined to an induction motor 156. The motors 155 and 156 are controlled in the same manner as the motors in FIGS. 13 and 15.

According to the embodiments 2–4 described above, the AC motor for driving the wheels are divided into the permanent magnet synchronous motor having high efficiency, and the induction motor having high torque, great output power, and a wide output range. In addition, the synchronous motor is driven by the high energy type battery via the inverter, and the induction motor is driven by the high output power type battery via the other inverter. With this arrangement, in the low output power range, only the synchronous motor is operated, and in the high output power range, only the induction motor or both synchronous and induction motors are operated. As a result, the following advantages are obtained.

(1) Since the availability of the batteries increases, the size, weight, and cost of the batteries mounted on the vehicle can be reduced.

(2) Since only the synchronous motor is operated in the low output power range, which occupies the longest time in the operation of the electric vehicle, the efficiency of the system can be increased.

(3) As a result, the mileage per charge of the electric vehicle increases.

EMBODIMENT 5

Figure 17:
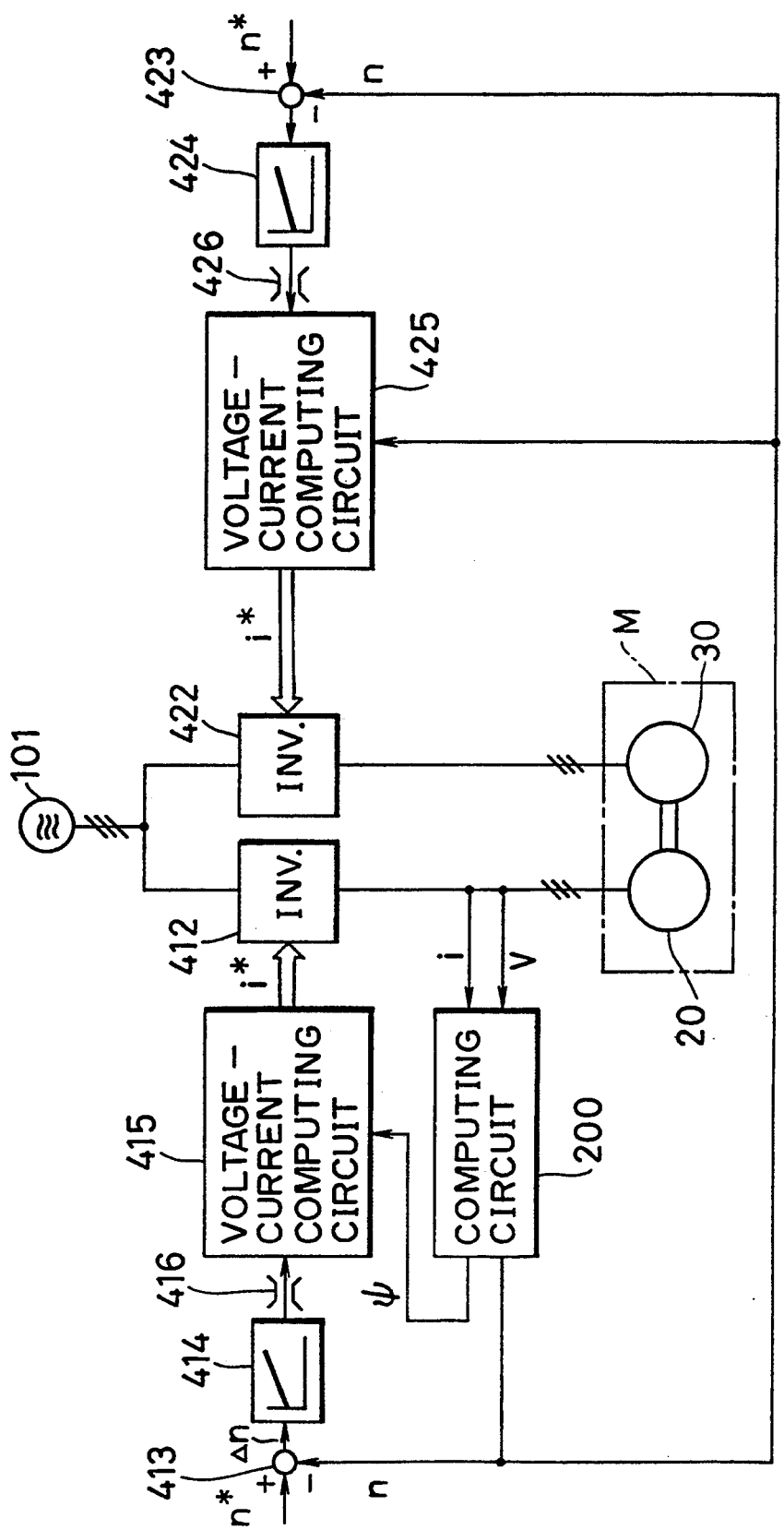
FIG. 17 is a block diagram showing a fifth embodiment in accordance with the present invention.

FIG. 17 shows a fifth embodiment in accordance with the present invention.

In FIG. 17, the AC motor M comprises the permanent magnet synchronous motor 20 and the induction motor 30, which have a common rotor shaft, and are integrally constructed in a single frame. The synchronous motor 20 is connected to an inverter 412, and the induction motor 30 is connected to an inverter 422. The inverters 412 and 422 are connected to an AC power supply (a commercial power supply) 101. Although the construction of the AC motor M is similar to that of FIG. 5, the sensor 12 shown in FIG. 5 is not provided here.

Each of the inverters 412 and 422 includes a rectifying portion that performs AC/DC conversion, and an inverting portion that performs DC/AC conversion. When the inverters 412 and 422 receive only direct voltage source, that is, perform only DC/AC conversion, two DC power supplies are connected separately, or a DC power supply is connected in common, in place of the AC power supply 101.

A control circuit of the motors 20 and 30 comprises adders 413 and 423, PI controller 414 and 424, voltage-current computing circuits 415 and 425 and limiter circuits 416 and 426. The adder 413 (423) outputs the difference between the speed command value n* and the actual speed n. The PI controller 414 (424) outputs a torque command value such that the speed difference is reduced to zero. The voltage-current computing circuit 415 (425) outputs the voltage command value or the current command value to the inverter 412 (422). The limiter circuit 416 (426) limits the torque command value.

The actual speed (the number of rotations) n and the magnetic position $\Psi$ of the rotor needed for driving the permanent magnet synchronous motor in the speed control of the motors 20 and 30 are obtained from a position-speed computing circuit 200.

The computing circuit 200 is necessary for performing a sensorless driving of the permanent magnet synchronous motor 20, which is known in the art. For example, see, Watanabe, et al., "A Sensorless Detecting Strategy of Rotor Position and Speed on Permanent Magnet Synchronous Motor", The Journal of the Institute of Electric Engineers of Japan, D-110, No. 11, pages 1193–1200.

The principle of this method is as follows: First, the voltage of each phase winding and instantaneous value of the current of the synchronous motor are detected on the inverter side; second, the positional angle of the rotor and the rotation speed are computed on the basis of the detected values, by a DSP (Digital Signal Processor) under the control of a microprocessor.

In a similar way, the computing circuit 200 detects the magnetic position $\Psi$ of the rotor and the rotational speed n by the digital computation based on the voltage and current applied to the synchronous motor 20. Instead of using the actual values of the voltage and current applied to the synchronous motor 20, the command value of the voltage, which can be calculated in the voltage-current computing circuit 415, and that of the current fed to the inverter 412 from the voltage-current computing circuit 415 may be used.

As is known in the art, in order to control the permanent magnet synchronous motor 20, it is necessary to control the phases of the applied currents in response to the magnetic position of the rotor. In the present embodiment, the computation of the computing circuit 200 makes it possible to detect the absolute position $\Psi$ of the rotor and the rotation speed n in the speed control loop without using a sensor.

With regard to the induction motor 30, the rotation speed obtained by the computing circuit 200 is used as the feed back value in the speed control loop, and the torque command value is produced from the PI controller 424.

Figure 4:
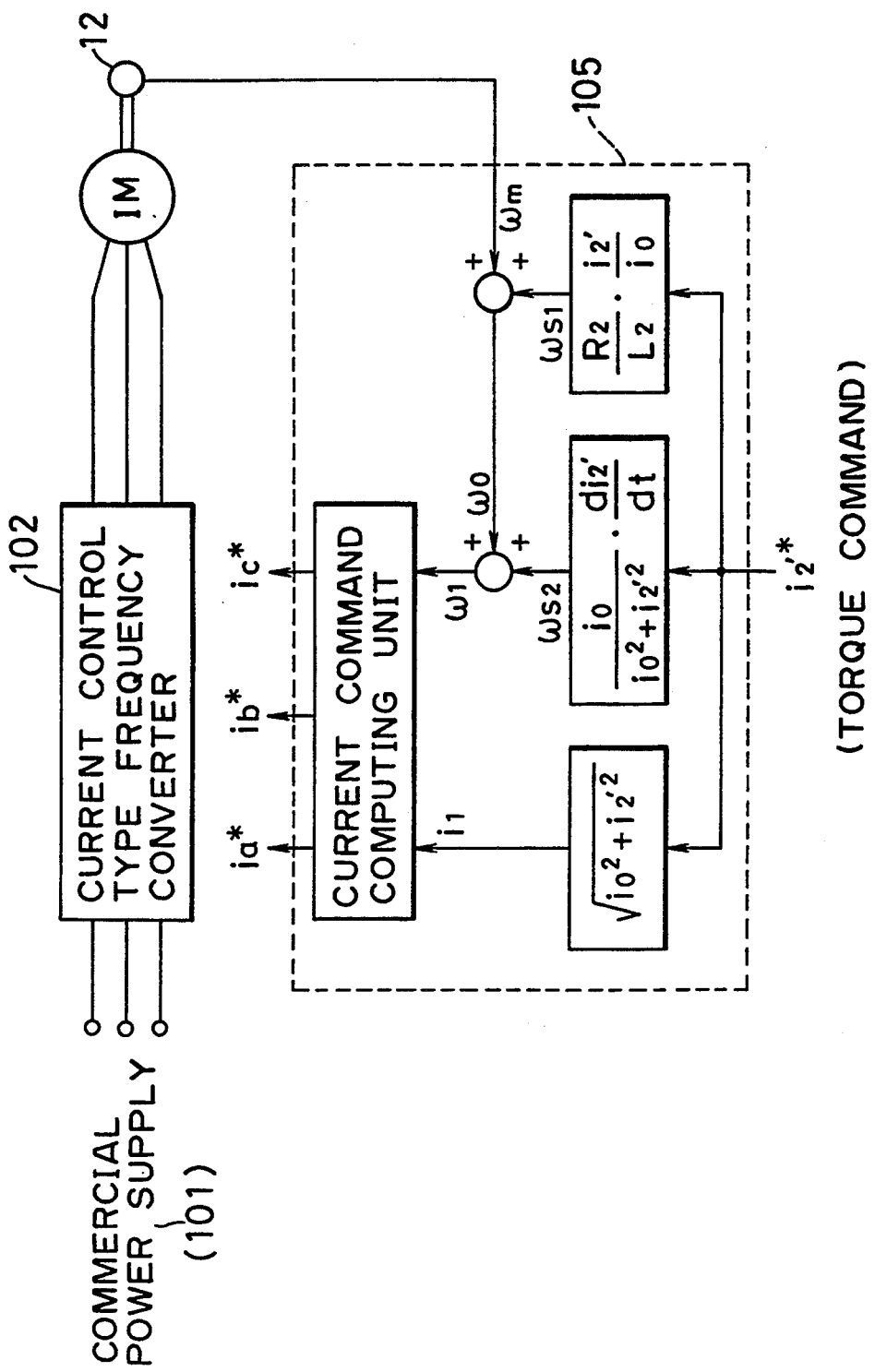
FIG. 4 is a block diagram showing a vector control system of an induction motor.

On the other hand, the rotation speed n is used as relative angle information of the rotor, which is necessary to carry out the coordinate transformation in the vector control as shown in FIG. 4.

According to this embodiment, the position-speed computing circuit 200 is used at least as a speed computing circuit, and the rotation speed n computed by the circuit is used as the feedback value of the speed to the speed command value to the induction motor 30. Thus, the rotation speed n produced from the computing circuit 200 is used in the speed control loop of the induction motor 30.

In addition, the voltage-current computing circuit 425 is provided for the purpose of obtaining the voltage or current command values to be fed to the stator windings of the induction motor 30 by using the command value of the secondary flux, the torque command value, and the electric constants of the induction motor 30. The torque command value is fed from the controller 424. The command value of the secondary flux and the electric constants are pre-set in the circuit 425 as the inherent constants of the induction motor 30. Thus, the magnetic position $\Psi$ of the rotor or the rotation speed n outputted from the position-speed computing circuit 200 is used by the voltage-current computing circuit 425 as the position of the rotor or the speed signal of the induction motor 30. Accordingly, although the rotation speed n is inputted to the computing circuit 425 in FIG. 17, the magnetic position $\Psi$ of the rotor computed by the computing circuit 200 may be used instead of the rotation speed n.

According to this embodiment, the speed control and the torque control of the induction motor 30 which is integrally constructed with the synchronous motor 20 can be carried out by using the absolute magnetic position of the rotor or the rotation speed of the synchronous motor 20 which is obtained by the computation during the sensorless drive of the permanent magnet synchronous motor 20.

EMBODIMENT 6

Figure 18:
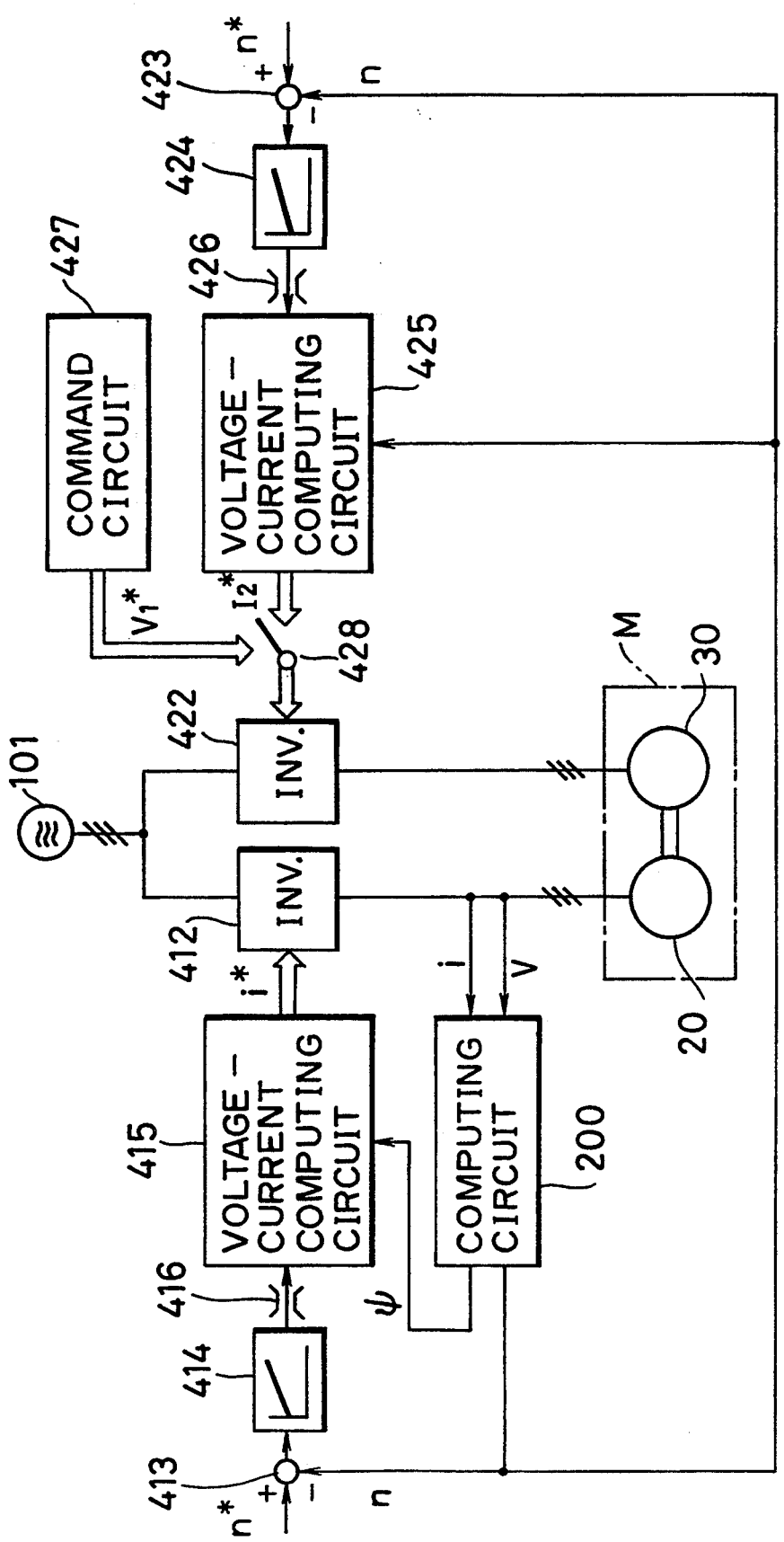
FIG. 18 is a block diagram showing a sixth embodiment in accordance with the present invention.

FIG. 18 shows a sixth embodiment in accordance with the present invention.

This embodiment differs from the fifth embodiment shown in FIG. 17 in that two command values $v_1$* and $I_2$* are switched by a switch 428 so that one of them is applied to the inverter 422. The voltage command value $v_1$ is issued from a command circuit 427, and the current command value $I_2$ is calculated by the computing circuit 425 on the basis of the torque command value from the PI controller 424.

According to this embodiment, the induction motor 30 can be started in the open-loop operation by applying the voltage command value $v_1^*$ from the command circuit 427. In this case, the command circuit 427 regulates the voltage command value $v_1^*$ to satisfy the condition of the constant V/F (Voltage-to-Frequency ratio) control which matches the characteristics of the induction motor. The constant V/F control of the induction motor 30 is continued for a predetermined period of time until the AC motor M gains a certain speed at which the synchronous motor 20 generates a counter-electromotive force large enough to accurately detect therefrom the magnetic position of the rotor and the speed of the synchronous motor. Once the predetermined period of time has elapsed, the switch 428 is switched to supply the current command value $I_2^*$ produced from the computing circuit 425, and the control scheme of the induction motor is switched to the vector control.

Thus, adding the command circuit 427 and the switch 428 makes it possible for the position-speed computing circuit 200 to employ a method that uses the counter-electromotive force of the permanent magnet synchronous motor 20 to compute the magnetic position of the rotor or the rotation speed of the synchronous motor.

The first embodiment described before with reference to FIG. 6 poses the following problems:

(1) Let us consider the case where the inverter 25 for the permanent magnet synchronous motor 20 in FIG. 6 fails, and only the induction motor 30 is driven by the other inverter 35, while disconnecting the inverter 25 from the main battery 1 by the DC current disconnecting switch 27. In this case, the permanent magnet synchronous motor 20 produces a velocity electromotive force because the flux of the permanent magnet moves across the stator windings, and the electromotive force is applied to the inverter 25. The velocity electromotive force may act in such a manner that it further impairs the failure of the inverter 25 depending on the type of that failure.

(2) In addition, in the electric system as shown in FIG. 6, effective measures to charge the main battery 1 by utilizing the inverter have not yet been proposed, and a separate charging circuit attached thereto is generally complicated in circuit arrangement and is expensive.

A seventh embodiment in accordance with the present invention is proposed to prevent the velocity electromotive force from being applied to the inverter for the synchronous motor even if that inverter fails and so only the induction motor is operated. An eighth embodiment in accordance with the present invention is proposed to provide a simple, inexpensive charging system of the main battery of the electric vehicle driving system.

EMBODIMENT 7

Figure 19:
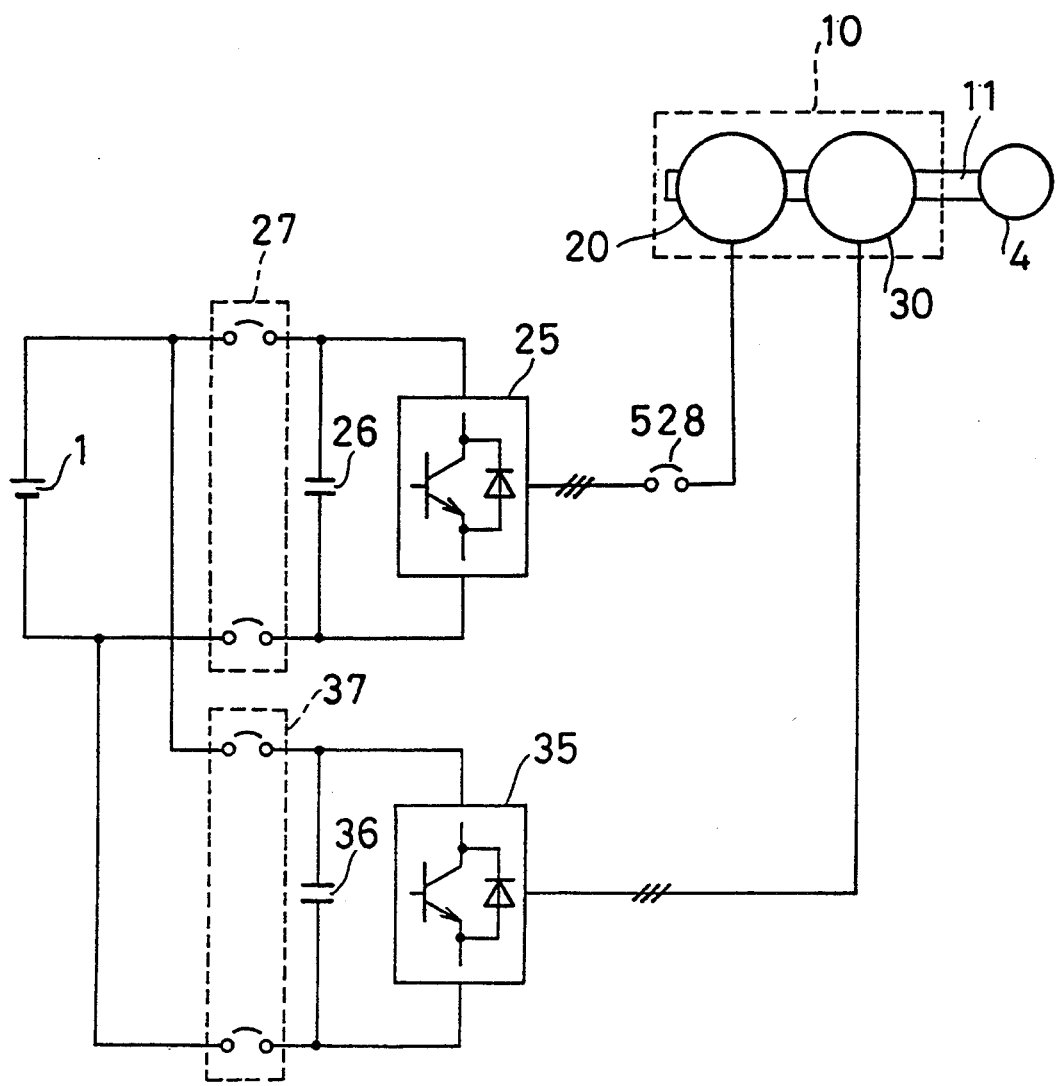
FIG. 19 is a block diagram showing a seventh embodiment in accordance with the present invention.

FIG. 19 show the seventh embodiment in accordance with the present invention. In FIGS. 19 and 6, the same reference numerals designate the same elements, and the description thereof is omitted here.

The seventh embodiment differs from the first embodiment shown in FIG. 6 in that it comprises a three-phase breaker 528 which is inserted in the power lines (AC output lines of the inverter 25) connecting the permanent magnet synchronous motor 20 to the inverter 25 that supplies power to that motor. Thus, the breaker 528 functions as a motor disconnecting means for disconnecting the electrical connection between the inverter 25 and the motor 20.

If the inverter 25 fails, it is disconnected from the main battery 1 by the DC disconnecting circuit 27.

In this case, when the operation is continued by the inverter 35 and the induction motor 30 which are not injured, the permanent magnet synchronous motor 20 produces a velocity electromotive force because the flux of the permanent magnet moves across the stator windings during the rotation of the axis of rotation 11. This electromotive force might be applied to the inverter 25 as a DC voltage through a freewheeling diode, and might act in such a manner that it further impairs the failure of the inverter 25 depending on the type of the failure.

To prevent this, the present embodiment operates the breaker 528 to disconnect the synchronous motor 20 from the inverter 25 before driving the induction motor 30. Thus, the velocity electromotive force generated in the permanent magnet synchronous motor 20 has no adverse effect on the inverter 25.

If the inverter 35 for the induction motor 30 fails, it is unnecessary to break the lines between the inverter 35 and the induction motor 30 because the velocity electromotive force is not generated in the induction motor 30.

According to this embodiment, even if the inverter for the synchronous motor fails, the induction motor 30 can operate without fear of further impairing that inverter. This makes it possible to increase the redundancy of the driving apparatus because the induction motor can be used when the synchronous motor fails or vice versa.

EMBODIMENT 8

Figure 20:
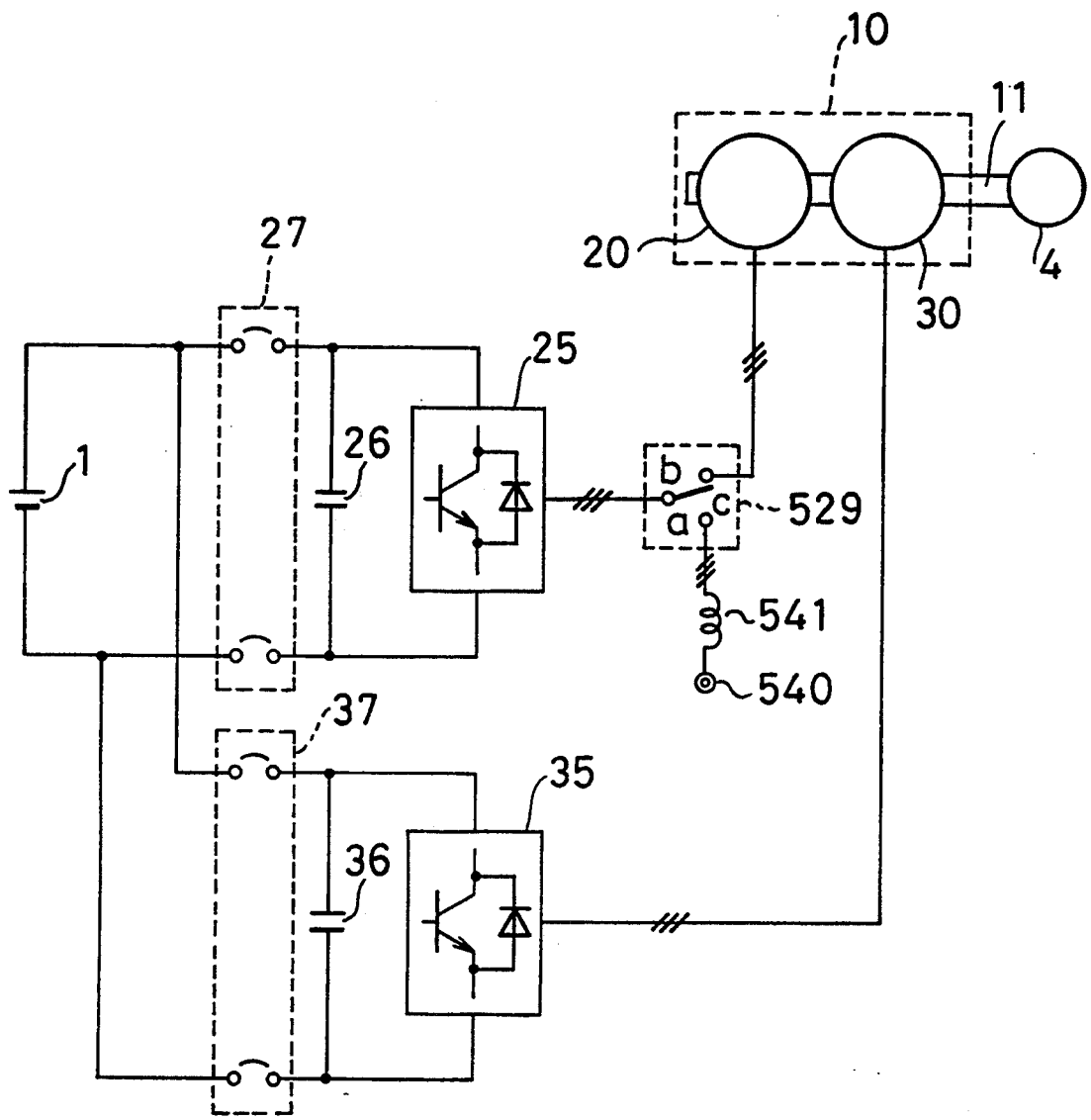
FIG. 20 is a block diagram showing an eighth embodiment in accordance with the present invention.

FIG. 20 show an eighth embodiment in accordance with the present invention.

In this embodiment, a motor disconnecting means for disconnecting the synchronous motor 20 from the inverter 25 comprises a three-phase transfer switches 529 (although only one transfer switch element is shown in FIG. 20, there are actually three transfer switch elements, each of which is for each one of the three phases). The switch 529 changes the connection of the AC output lines of the inverter 25 to either the synchronous motor 20 or to AC input terminals 540 for an AC power supply.

The transfer switch 529 is connected to the synchronous motor 20 at its terminals b, and to the AC input terminals 540 at its terminals c via reactors 541. The AC input terminals 540 are connected to a three-phase or a single phase commercial power supply.

In a normal operation mode, the transfer switch 529 is connected to the b terminals, that is, to the synchronous motor 20, and the inverter 25 supplies AC power to the synchronous motor 20. In case where the inverter 25 fails, the transfer switch 529 is changed to the a terminals, and the DC disconnecting means 27 is turned off. Thus, the inverter 25 is disconnected from the battery 1 and the synchronous motor 20.

This state is substantially equal to the operation during a fault of the inverter 25 of FIG. 19. Thus, the inverter 25 is protected from the velocity electromotive force that would be applied to the inverter 25 in failure.

As is well known, the main battery 1 of the electric vehicle must be recharged after it travels a predetermined time or distance.

This embodiment is provided with a charging means as shown in FIG. 20. In the charging mode, the DC disconnecting means 27 is closed, and the AC input terminals 540 are connected to a three-phase or single phase commercial power supply while the transfer switch 529 is connected to the a terminals. With this arrangement, the AC power passes through the reactors 541, the transfer switch 529 and the freewheeling diodes in the inverter 25, and thus the DC power is supplied to the main battery 1 via the DC disconnecting means 27.

The reactors 541 are used to limit the AC current, and may be inserted between the AC input terminals 540 and the commercial power supply.

According to this embodiment, the charging circuit of the main battery 1 can be arranged by only adding simple elements such as the transfer switch 529 and the reactors 541. These elements can be mounted on the vehicle with little increase in the size and weight of the vehicle.

In addition, using the freewheeling diodes serves to increase the availability of the inverter 25.

Although only two inverters each of which corresponds to each one of the motors 20 and 30 are employed in the seventh and eighth embodiments, the present invention can also be applied to a system in which a plurality of inverters are connected to each one of the motors 20 and 30.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An AC variable speed driving apparatus including an AC motor and an inverter which drives the AC motor, said AC motor comprising:
   a first rotor having a permanent magnet, said first rotor being mounted on an axis of rotation;
   first stator windings constituting a synchronous motor in conjunction with said first rotor;
   a second rotor mounted on said axis of rotation; and
   second stator windings constituting an induction motor in conjunction with said second rotor, said first and second stator windings being disposed so that they do not magnetically interfere with each other, the number of poles of said synchronous motor being equal to that of said induction motor, and said first and second stator windings being displaced with respect to each other in a direction of rotation of said first and second rotors by a predetermined electrical angle,
   whereby said inverter independently supplies said first and second stator windings with AC power thereby driving said synchronous motor and said induction motor separately.

2. An AC variable speed driving apparatus including an AC motor and an inverter which drives the AC motor, said AC motor comprising:
   a first rotor having a permanent magnet, said first rotor being mounted on an axis of rotation;
   first stator windings constituting a synchronous motor in conjunction with said first rotor;
   a second rotor mounted on said axis of rotation;
   second stator windings constituting an induction motor in conjunction with said second rotor, said first and second stator windings being disposed so that they do not magnetically interfere with each other;
   torque control means for controlling said synchronous motor and said induction motor via said inverter, said torque control means performing on said synchronous motor a constant torque control in which constant torque is outputted over an entire speed range, and on said induction motor a constant torque control in a range below a predetermined speed; and
   a flux weakening control in a range above said predetermined speed, an output torque of said AC motor being a sum of an output torque of said synchronous motor and an output torque of said induction motor,
   whereby said inverter independently supplies said first and second stator windings with AC power thereby driving said synchronous motor and said induction motor separately.

3. An electric system for an electric vehicle comprising:
   a first battery;
   a second battery, said first battery having greater energy density or greater energy than said second battery, and said second battery having greater output power density or greater output power than said first battery;
   an AC motor for driving wheels of the electric vehicle, said AC motor including a synchronous motor and an induction motor having a common axis of rotation;
   a first inverter connected between said first battery and said synchronous motor; and
   a second inverter connected between said second battery and said induction motor.

4. An electric system for an electric vehicle comprising:
   a first battery;
   a second battery;
   an AC motor for driving wheels of the electric vehicle, said AC motor including a synchronous motor and an induction motor having a common axis of rotation;
   a first inverter connected between said first battery and said synchronous motor; and
   a second inverter connected between said second battery and said induction motor, only said synchronous motor being operated in a low output range, and only said induction motor or both said synchronous motor and said induction motor being operated in a high output range.

5. An AC variable speed driving apparatus as claimed in claim 2, wherein said synchronous motor has larger overload capacity in low and middle speed ranges than in a high speed range.

6. An AC variable speed driving apparatus as claimed in claim 2, wherein a torque command value $\tau_s^*$ of said synchronous motor and a torque command value $\tau_i^*$ of said induction motor are determined as follows:
   (1) $\tau_s^* = \tau^*$, and $\tau_i^* = 0$, when $\tau^* \leq \tau_{smax}$; and
   (2) $\tau_s^* = \tau_{smax}$, and $\tau_i^* = \tau^* - \tau_{smax}$, when $\tau^* > \tau_{smax}$,
   where $\tau^*$ is a total torque command value of said AC motor, and $\tau_{smax}$ is a maximum output torque of said synchronous motor.

7. An AC variable speed driving apparatus as claimed in claim 2, wherein a torque command value $\tau_s^*$ of said synchronous motor and a torque command value $\tau_i^*$ of said induction motor are determined as follows:

(1) when $\tau^* \leq \tau_{scont}$, $\tau_s^* = \tau^*$, and $\tau_i^* = 0$;

(2) when $\tau_{scont} < \tau^* \leq \tau_{scont} + \tau_{icont}$, $\tau_s^* = \tau_{scont}$, and $\tau_i^* = \tau^* - \tau_{scont}$;

(3) when $\tau_{scont} + \tau_{icont} < \tau^* \leq \tau_{smax} + \tau_{icont}$, $\tau_s^* = \tau^* - \tau_{icont}$, and $\tau_i^* = \tau_{icont}$; and (4) when $\tau^* > \tau_{smax} + \tau_{icont}$, $\tau_s^* = \tau_{smax}$, and $\tau_i^* = \tau^* - \tau_{smax}$, where $\tau^*$ is a total torque command value of said AC motor, $\tau_{scont}$ is continuous rating torque of said synchronous motor, $\tau_{icont}$ is continuous rating torque of said induction motor, and $\tau_{smax}$ is a maximum output torque of said synchronous motor.

8. An AC variable speed driving apparatus as claimed in claim 6 further comprising a filter circuit to which said torque command value $\tau_i^*$ of said induction motor is inputted, said filter circuit having a time constant sufficiently larger than a secondary circuit time constant of said induction motor, wherein an exciting current supplied to said induction motor is stopped when said torque command value $\tau_i^*$ after passing through said filter is substantially zero.

9. An AC variable speed driving apparatus comprising:
an AC motor including a first rotor having a permanent magnet mounted on a rotor shaft, a second rotor mounted on said rotor shaft, and first and second stator windings corresponding to said first and second rotors respectively disposed so that they do not magnetically interfere with each other said first rotor and said first stator windings constituting a synchronous motor, and said second rotor and said second stator windings constituting an induction motor, said synchronous motor and said induction motor being integrally constructed into one body;
an inverter independently supplying said first and second stator windings with AC power;
first computing means for computing a rotation speed of said first rotor on the basis of actual values of voltages and currents of said synchronous motor or on the basis of command values of voltages and currents of said synchronous motor; and
control means for controlling said induction motor by using the rotation speed computed by said first computing means as a feedback value corresponding to the speed of said induction motor.

10. An AC variable speed driving apparatus as claimed in claim 9, further comprising second computing means for computing command values of voltages or currents to be supplied to said second stator windings by using secondary flux command values and a torque command value to said induction motor, and electric constants of said induction motor, wherein said first computing means computes a magnetic position of said first rotor or a rotation speed of said first rotor on the basis of actual values of voltages and currents of said synchronous motor or on the basis of command values of voltages and currents of said synchronous motor, and said second computing means uses said magnetic position of said first rotor or said rotation speed of said first rotor outputted from said first computing means as a position or a speed signal of said rotor of said induction motor.

11. An AC variable speed driving apparatus as claimed in claim 9, further comprising a command circuit which outputs to said induction motor voltage command values that have a predetermined voltage-to-frequency ratio and is used to drive only said induction motor during a starting time period of said induction motor, and switching means for switching command values to be supplied to said induction motor, from said voltage command values to current command values computed on the basis of said torque command value, after a predetermined time has elapsed from the start of said induction motor, or after said induction motor has reached a predetermined speed.

12. An electric vehicle driving apparatus comprising:
an AC motor including a permanent magnet synchronous motor and an induction motor which are integrally constructed into a single body, said synchronous motor having a rotor including a permanent magnet, and said synchronous motor and said induction motor having a common axis of rotation joined to a shaft for driving one or more wheels;
a first inverter supplying AC power to windings of said synchronous motor;
a second inverter supplying AC power to windings of said induction motor;
a main battery supplying said first inverter and said second inverter with a DC voltage;
first disconnecting means for electrically disconnecting said first inverter from said main battery;
second disconnecting means for electrically disconnecting said second inverter from said main battery; and
third disconnecting means connected to AC output lines of said first inverter for electrically disconnecting said synchronous motor from said first inverter.

13. An electric vehicle driving apparatus as claimed in claim 12, further comprising means for connecting said AC output lines of said first inverter, which is electrically disconnected from said synchronous motor by said third disconnecting means, to an external AC power supply so that said main battery is charged through said inverter.

* * * * *